(12) United States Patent
Engdahl Toledo et al.

(10) Patent No.: US 10,544,480 B2
(45) Date of Patent: Jan. 28, 2020

(54) AGGLOMERATION DRUM FOR PRE-TREATING MINERALS

(71) Applicants: K+S CHILE S.A., Santiago (CL); UNIVERSIDAD TÉCNICA FEDERICO SANTA MARIA, Santiago (CL)

(72) Inventors: Oscar Engdahl Toledo, Santiago (CL); Juan Carlos Flaquer, Santiago (CL); Jorge Ipinza Abarca, Santiago (CL); Juan Patricio Ibáñez, Valparaíso (CL)

(73) Assignees: K+S Chile S.A., Santiago (CL); Universidad Tecnica Federico Santa Maria, Valparaiso (CL)

( * ) Notice: Subject to any disclaimer, the term of this patent is extended or adjusted under 35 U.S.C. 154(b) by 138 days.

(21) Appl. No.: 15/573,677

(22) PCT Filed: May 12, 2016

(86) PCT No.: PCT/CL2016/050023
§ 371 (c)(1),
(2) Date: Nov. 13, 2017

(87) PCT Pub. No.: WO2016/179718
PCT Pub. Date: Nov. 17, 2016

(65) Prior Publication Data
US 2018/0119247 A1    May 3, 2018

(30) Foreign Application Priority Data
May 13, 2015  (CL) .................................. 1298-2015

(51) Int. Cl.
*C22B 1/16*  (2006.01)
*B01J 2/12*  (2006.01)
*C22B 15/00*  (2006.01)

(52) U.S. Cl.
CPC .................... *C22B 1/16* (2013.01); *B01J 2/12* (2013.01); *C22B 15/0071* (2013.01)

(58) Field of Classification Search
None
See application file for complete search history.

(56) References Cited

U.S. PATENT DOCUMENTS

| | | |
|---|---|---|
| 2,707,304 A | 3/1954 | Haley |
| 3,362,809 A | 1/1968 | Tucker |
| (Continued) | | |

FOREIGN PATENT DOCUMENTS

| | | |
|---|---|---|
| AU | 2010/207893 | 8/2011 |
| EP | 1 734 137 B1 | 12/2006 |
| (Continued) | | |

OTHER PUBLICATIONS

EP 1 734 137 B1 _ English Abstract.

*Primary Examiner* — Mary Lynn F Theisen
(74) *Attorney, Agent, or Firm* — Ladas & Parry LLP

(57) ABSTRACT

The present invention refers to an agglomeration drum and to a procedure for the agglomeration of mineral inside said drum for the pretreatment of minerals, both of them mainly used in hydrometallurgy. Said drum and procedure use a system and a phase of recirculation of gases as part of the invention. Additionally, in the agglomeration procedure the process of chemical reactions occurring inside the agglomeration drum is included. The agglomeration drum, agglomeration procedure and the reactive process allow to obtaining uniform, stable and poorly degradable agglomerates that have a bigger agglomerate-reagent contact surface. The agglomerates or aggregates produced in the agglomeration drum and according to the process of the invention increase the extractive yield of the later leaching process, thus reducing the creation of preferred ways for the leaching solution in the leaching piles. In addition, the drum and (Continued)

procedure of the invention allow preventing the release of gases to the environment, having a gas recirculation system, which by being closed keeps gases inside the agglomeration drum and process. This recirculation of gases not only allows preventing the release of said gases to the environment, but it also reduces the operating costs by using the recirculated gases as part of the agglomeration process.

45 Claims, 23 Drawing Sheets

(56) References Cited

U.S. PATENT DOCUMENTS

| | | | |
|---|---|---|---|
| H000980 H | * | 11/1991 | Harrison ................. 264/117 |
| 5,236,492 A | | 8/1993 | Shaw et al. |
| 2004/0156765 A1 | | 8/2004 | Lalancette |

FOREIGN PATENT DOCUMENTS

| | | |
|---|---|---|
| GB | 1099856 A | 1/1968 |
| GB | 1 236 974 A | 6/1971 |
| GB | 2 192 805 A | 1/1988 |

* cited by examiner

| Element | Percentages | |
|---|---|---|
| | Weight | Atomic |
| O | 11,45 | 22,06 |
| S | 32,47 | 31,20 |
| Fe | 22,00 | 12,14 |
| Cu | 24,62 | 11,94 |

| Element | Percentages | |
|---|---|---|
| | Weight | Atomic |
| O | 16,07 | 35,06 |
| S | 28,07 | 30,56 |
| Fe | 25,88 | 16,17 |
| Cu | 26,97 | 14,82 |

| Element | Percentages | |
|---|---|---|
| | Weight | Atomic |
| O | 48,4 | 63,36 |
| Na | 7,30 | 6,65 |
| S | 19,74 | 12,90 |
| Fe | 11,19 | 4,20 |
| Cu | 5,47 | 1,80 |

AGGLOMERATION DRUM FOR PRE-TREATING MINERALS

RELATED APPLICATION INFORMATION

This application is a 371 of International Application PCT/CL2016/050023 filed 12 May 2016, which claims priority from Chilean Application No.: 1298-2015 filed 13 May 2015, the content of which is incorporated herein by reference.

The present invention refers to an agglomeration drum and to a procedure for the agglomeration of mineral inside said drum for the pretreatment of minerals, both of them mainly used in hydrometallurgy. Said drum and procedure use a gas recirculation system and a step as part of the invention. Additionally, the process of chemical reactions occurring inside the agglomeration drum is included in the agglomeration procedure. The agglomeration drum, agglomeration procedure and the reactive process allow to obtaining uniform, stable and poorly degradable agglomerates that have a bigger agglomerate-reagent contact surface. The agglomerates or aggregates produced in the agglomeration drum and according to the process of the invention increase the extractive yield of the later leaching process, thus reducing the creation of preferred paths for the leaching solution in the leaching piles.

In addition, the drum and procedure of the invention allow preventing the release of gases to the environment, having a gas recirculation system, which by being closed keeps gases inside the agglomeration drum and process. This recirculation of gases not only allows preventing the release of said gases to the environment, but it also reduces the operating costs by using the recirculated gases as part of the agglomeration process.

BACKGROUND

The hydrometallurgical processes include in their flow charts agglomeration cylinders or drums, which are commonly used to improve the leaching processes. The agglomeration drums are equipment mainly destined to the dry agglomeration of minerals with medium and fine grain size distribution, i.e. a particle size between ¾ inches and 1 inch.

In said agglomeration drums and by the addition of liquid reagents being supplied after the entry of mineral, as for example water and concentrated sulfuric acid, uniform agglomerates are produced known as "aggregates", which are used in later processes as leaching. Considering this, the agglomeration cylinders or drums are equipment especially indicated for the agglomeration of minerals of copper, nickel and zinc, among others.

Generally, the agglomeration cylinder known in the state of the art is formed by a single chamber opened to the environment provided with rectangular cross-section lifting bars in the inside, properly spaced, so that a rolling movement of the material inside the same is generated. Said rolling movement of the material, along with the humidification originated by the reagents added in the feeding area produce the formation of a uniform and consistent "aggregate". The rotational speed of the agglomeration cylinder, the cross-section of lifters and its spacing are studied for each case according to the nature and size of the mineral particles to be agglomerated and to the residence time that is necessary to produce the "aggregate".

Thus, the agglomeration drums must withstand high mechanic stresses mainly produced by the movement of the material inside and by the weight and impact of the agglomeration load circulating inside the drum. This is the reason why they must be built with resistant materials and be part of a highly robust structure. Additionally, the agglomeration drums and mainly the inside thereof are subject to great wearing loads resulting both from the movement of material that generates abrasion over the surfaces, and the presence of an environment that can be corrosive depending on the reagents used to produce the aggregates. This is why they are preferably built of wear-resistant materials or coated with such kind of materials.

Considering this, the agglomeration drums are commonly supplied as a compact and complete unit, including a feeding trough, a discharge box, outlet of gases to the environment and acid dosing flutes in the feeding area. At this point it should be noted that the agglomeration drums of the prior state of the art release the gases produced in the process directly to the environment, resulting in possible environmental and/or health risks due to the release of toxic gases, and limiting the use of the desirable reagents due to their toxicity.

In fact, for example documents GB2192805, US2004156765 and AU2010207893 describe agglomeration drums and/or processes that are open to the environment and/or not describing a gas recirculation system or phase integrated to the agglomeration process taking place inside the drum. This is why said documents describe systems and processes that limit to the use of reagents that do not generate toxic substances that can be released to the environment. In addition, the documents of the prior art that use reagents that can release toxic substances, as the application US2004156765, do not consider the treatment of said substances, thus being why they do not solve the problem associated with their presence in the process.

Additionally, the document EP1734137 refers to a process to agglomerate iron minerals that suppresses the emission of gases to the atmosphere, but said procedure uses a system of recirculation for residual gases for their reintroduction to the nozzles of a blast furnace as combustion gases. Although this kind of process is widely known in the state of the art, allowing a substantial reduction in the release of toxic gases to the environment, as the combustion gases for example, it cannot be implemented in the agglomeration processes directly, because said processes comprise rotational systems allowing to forming aggregates of the material as required. In addition, the mere recirculation of gases in agglomeration equipment does not solve the problem of using said gases to benefit the process performed inside the equipment; thus, the agglomeration process would not improve by including recirculation.

Before the problems existing in the solutions available in the prior state of the art it is necessary to have an agglomeration drum and an agglomeration process to produce uniform, stable and poorly degradable agglomerates with a greater agglomerate-reagent contact surface, increasing the extractive yield of the later process of leaching, reducing the creation of preferred ways of the leaching solution in the leaching piles.

It is also necessary to have an agglomeration drum and an agglomeration procedure that can prevent the release of gases to the environment, allowing the efficient use of gases during the agglomeration process, reducing both the environmental contamination and/or damage to health, and allowing the use of highly effective reagents, preventing the formation of elementary sulfur that constitutes a barrier in the leaching process.

DESCRIPTION OF THE INVENTION

The present invention refers to an agglomeration drum and an agglomeration procedure for the production of uniform, stable and poorly degradable agglomerates with a greater agglomerate-reagent contact surface. Additionally, both the drum and the process of the invention allow increasing the extractive yield of later processes, as the leaching process and, at the same time they prevent the release of gases to the environment, reducing the environmental and/or health risks ad allowing the use of high efficacy desirable reagents.

Moreover, the invention also refers to the chemical process occurring inside the agglomeration drum, which allows increasing the recovery of material in the later extractive processes.

In this context, the agglomeration drum of the invention comprises a main hollow cylinder preferably built of very thick rolled steel plate supported or held by a supporting structure over which the main cylinder rotates during the agglomeration process. Said main cylinder can comprise any hollow cylindrical shape, such as a rectangular cylinder, preferably using a circumferential cylindrical shape. In fact, cylinder means any geometric configuration formed by the displacement of a straight line called generatrix along a flat closed curve called directrix, where said directrix can have different polygonal closed forms, as a rectangle, a square, a triangle or a hexagon, among others, or circular forms as a circumference or ellipse, among others.

The main cylinder of the agglomeration drum is preferably inclined with its inlet end at a greater height than the outlet end. Said inclination, which according to an embodiment can be manually or automatically adjustable, allows the circulation of the material that enters the agglomeration drum by gravity and rotation inside the drum, with said material moving from the inlet end upstream the agglomeration drum to the outlet end downstream the agglomeration drum. In this respect, the inclination of the agglomeration drum has direct incidence on the residence time of the material inside the agglomeration drum, since as the inclination increases the material will move towards the outlet end faster. Then, the variation in the inclination of the agglomeration drum allows adapting the process to different types of materials to be agglomerated and to different reagents to be used during the agglomeration, because for each material and reagent different residence and/or reaction times are required in order to achieve the maximum efficiency of the pretreatment.

In addition, the main cylinder of the agglomeration drum comprises driving means that transmit the rotation movement from a driving device to the main cylinder; this allows said cylinder to rotate over its axial axis driven by said driving device. According to preferred embodiments of the invention, the driving means of the main cylinder correspond to a transmission system, which at least comprises a rack integrated to the cylinder, connected thereto permanently or forming part of its same structure, transmitting the rotational movement from the driving device to the main cylinder on a continuous basis. Other driving means can be used for the transmission of the movement from the driving device, as a system of belts, chains or another type of transmission of rotational movement.

In this context, the driving device can be any kind of mechanism that provides rotational movement to the main cylinder, as an electric engine. According to the preferred embodiment, said driving device comprises means to engage with the teeth of rack of the main cylinder, transmitting the rotation of the engine to said rack and allowing the agglomeration drum to rotate in a controlled manner. In this respect, it should be noted that the rotational speed of the main cylinder affects the agglomeration process directly, depending on the nature and size of the mineral particles to be agglomerated and the time of residence that is necessary to produce the "aggregate". Therefore, the present invention considers the possible variation of the rotational speed of the main cylinder in order to keep the agglomeration process at its maximum efficiency. Said variation can be, for example, carried out electronically, through a frequency converter of the driving device, which also allows a progressive start-up of the agglomeration drum and process. Finally, it should be noted that the driving device should be designed to allow the rotation of the main cylinder, considering the load thereof during the operation and in vacuum. In this respect, it is considered that the critical condition of the driving device of the rotation is the stop of the system during the operation, since the driving device shall give enough rotational force to overcome the inertia of the agglomeration drum loaded with material inside.

As already indicated, the rotation of the main cylinder is carried out over the supporting structure of the agglomeration drum. For these purposes, the supporting structure has a system of wheels arranged in structures called drum brackets. These drum brackets allow the wheels to rotate freely when getting in contact with the main cylinder, supporting the weight thereof and keeping its rotational movement. In an embodiment of the invention, the wheels are assembled to the drum guides existing in the external mantle or external surface of the main cylinder. This way it is prevented that said cylinder displaces longitudinally due to the inclination thereof.

According to an embodiment of the invention, the supporting structure of the agglomeration drum comprises a number of feet that can be joined each other by at least an upper beam and/or at least a transversal beam. Said feet are configured as supporting structures that fix the agglomeration drum to the floor. In addition, the supporting structure of the agglomeration drum comprises at least a lowerbeam over which the drum brackets are arranged that comprise the system of wheels over which the cylinder body rotates. Said lower beam is connected to the structure pivotally in one of its ends, for example to one of the feet or to a transversal beam and towards the inlet end of the agglomeration drum, where the other end of the lower beam is free and/or supported by an inclination system. The combination of the pivotal connection in one end and the implementation of the inclination system allow the variation of the inclination of the lower beam; this, in turn, varies the inclination of the cylinder body that is supported by said lower beam through a system of wheels and the brackets of the drum.

In addition, the inclination system can comprise any automatic or manual device allowing the controlled pivoting of the lower beam over its connection to the supporting structure, keeping the weight of the main cylinder during the operation of the agglomeration drum. In a preferred embodiment, said inclination system is defined by at least one hydraulic cylinder provided in the supporting structure, for example in one of the feet or longitudinal beams between the feet. Said at least one hydraulic cylinder drives at least one wedge horizontally, over which the at least one lower beam of those supporting the main cylinder rests. Said at least one wedge displaces by the action of the at least one hydraulic cylinder, for example over a rail, so that its displacement makes the lower beam to pivot in its connection with the supporting structure, thus varying its inclination and allowing the control of the retention and circulation of the material inside the agglomeration drum and obtaining a more efficient product. In fact, the inclination system of the invention allows the controlled modification of the inclination thereof over the horizontal axis and to adjust the residence time of the material displaced by rotation and gravity inside the drum. Other variations of the inclination system can be implemented keeping the qualities of the invention, i.e. supporting the weight of the main cylinder and the variation of the inclination thereof, where said inclination systems can be automatic, as already detailed, or manual, as for example a system of inclination comprising the implementation of a lower beam bracket, as for example a transversal beam over which the at least one lower beam rests during the operation, where said bracket can be mounted at different heights manually.

In terms of the general structure of the agglomeration drum, this equipment comprises a feeding chute located upstream and at the inlet end of the agglomeration drum arranged to receive the material to be exposed to the agglomeration process inside the drum. Said feeding chute can comprise any structure arranged to lead the material to be agglomerated inside the agglomeration drum. In this case, it is important for the joining between the feeding chute and the inlet of the agglomeration drum to be such that the continuous transfer of material is possible without any loss thereof, while the main cylinder remains rotating. In fact, the connection between the feeding chute and the main cylinder is rotational and preferably tight to the gases circulating inside the drum, preventing them to go to the environment and/or reducing its release. To this effect, the connection uses a bearing that facilitates the rotation of the main cylinder over the feeding chute and preventing the material entering the agglomeration drum to go out by the outlet end thereof, proposing a sealing system to keep gases inside the cylinder. Additionally, the connection between the feeding chute and the main cylinder of the agglomeration drum should be such that it allows the inclination of the main cylinder, while the feeding chute remains fixed, keeping the condition of rotation and tightness regarding the gases present inside the drum and injected thereto.

According to a preferred embodiment, the feeding chute consists in a rigid column, where an inlet opening is configured, preferably circular and arranged in the highest area of the equipment upstream the agglomeration drum. Through this opening, the material generally coming from a conveyor belt enters the agglomeration drum to start the agglomeration process inside the same.

At the outlet end opposing to the feeding chute, i.e. at the end downstream the agglomeration drum there is a discharge chamber for the evacuation of the agglomerated material and for the extraction of gases generated and/or being present inside the agglomeration drum. For this double function to be performed, the discharge chamber comprises both a discharge chute preferably located in the lower part of the chamber, and an exhaust hood preferably located in the upper part of the chamber. The exhaust hood of the discharge chamber is connected to a gas recirculation system in charge of extracting the gases from the discharge chamber and injecting them again into the agglomeration drum at least through an injection nozzle preferably upstream said drum, while the discharge chute facilitates that the agglomerated material, resulting product of the agglomeration drum, can be extracted from the equipment for its later use in such processes as the leaching process for example. In this context and like for the feeding chute, the connection between the discharge chamber and the main cylinder is rotational and preferably tight to the gases circulating inside the drum, facilitating their direct pass to the discharge chamber and preventing their going out to the environment and/or reducing their release. Thus, the connection uses a bearing that facilitates the rotation of the main cylinder over the discharge chamber, proposing a sealing system to prevent the gases passing to the discharge chamber to be released to the environment. Additionally, the connection between the discharge chamber and the main cylinder of the agglomeration drum should be such as to allow the inclination of the main cylinder, while the discharge chamber remains fixed, keeping the condition of rotation and tightness regarding the gases present inside the drum and passing to the discharge chamber for its suction by the recirculation system.

According to a preferred embodiment, the gas recirculation system connected to the exhaust hood of the discharge chamber comprises a duct for the conveyance of gases leading the gases from the discharge chamber (extraction point) to the inside of the agglomeration drum (injection point), preferably at the inlet area to the agglomeration drum, i.e. at the upstream end thereof. In addition, according to a preferred embodiment of the invention, for a successful extraction of gases from the discharge chamber, the gas recirculation system comprises a gas-driving device, as a fan, to suck in the gases from the extraction point, preferably said discharge chamber, and inject them at the injection point of the agglomeration drum, where said gas-driving device separates the recirculation system in a first part of the extraction located downstream the agglomeration drum, and at a second injection part located upstream the agglomeration drum. In this context, the gas-driving device arranged in the duct of gases has the function of extracting the gases downstream the agglomeration drum and driving the extracted gases. In a preferred embodiment, the gas recirculation system forms a closed loop of gases inside the main cylinder, preventing the gases to be released to the environment or reducing their release.

According to alternative embodiments of the invention, the extraction and injection of gases inside the agglomeration drum can be performed in any section of the main cylinder, but preferably extracting the gases to the cylinder downstream end and injecting the gases to the cylinder upstream end.

The components of the gas recirculation system should be adapted both to extract all gases generated and/or present in the discharge chamber, preventing their escape through the feeding chute, and to withstand the corrosive conditions of the gas to be transported, which can comprise acids and/or humidity and be at high temperatures. To this effect, the gas recirculation system comprises ducts and at least one gas-driving device designed both to convey a mass flow of gas determined by the amount of gas in the agglomeration drum as the result of the reaction performed inside the drum and from the very same recirculation, and to withstand the corrosion generated by the conveyance of the gas over the surfaces of the recirculation system, for example by implementing stainless steel with corrosive-resistant coating.

In addition, the gas recirculation system can comprise at least a filter of particles located towards the system's extraction part, where said at least one filter prevents the particles of the material to be suck in from the discharge chamber, preventing they to damage the gas-driving device and/or to clog the injection nozzle. Said filter of particles can be an electrostatic precipitator, a membrane filter or any other type of filter, which by being installed before the fan, preferably in the duct of gases and/or in the exhaust hood, allows to retaining the particles of the material that are suck in by the fan and, with this, preventing their getting in contact with the fan and/or reentering a gasification chamber along with the gas.

Seen from the inside of the agglomeration drum and according to a preferred embodiment, the inlet opening of the feeding chute is in direct communication with the first section of the main cylinder, where a gasification chamber exists. The gasification chamber comprises a preferably cylindrical surface separate from and concentric to the main cylinder, but of lesser diameter, thus forming an intermediate space between the gasification chamber and the inside surface of the main cylinder, keeping the bond between the gasification chamber and the main cylinder by internal brackets and/or connections arranged in the intermediate space. This allows the configuration of the intermediate space, while the elements remain joined for joint rotation. The gasification chamber also has a preferably circular inlet and concentric to the inlet opening of the feeding chute, where said inlet is connected to the injection nozzle fixed to the feeding chute, for example to the rigid column of the chute, and over which both the main cylinder and the gasification chamber rotate. In this context, the connection between the main cylinder and the feeding chute is available not only for the rotation of the main cylinder, but it should also withstand the rotation of the gasification chamber through the implementation of the injection nozzle, which connected to the gas recirculation system—allows the injection of the gases extracted from the discharge chamber of the agglomeration drum towards the gasification chamber.

According to an alternative embodiment, the gasification chamber has an independent rotation movement with respect to the main cylinder, having an independent driving device from the main cylinder or a movement transmission system that modifies the rotation rate of the main cylinder.

For the recirculated gas to enter the gasification chamber, the injection nozzle has openings in the nozzle allowing the gas to enter the intermediate space formed between the main cylinder and the gasification chamber, while the gasification chamber has openings in the chamber preferably located on the face of the chamber's inlet, where said opening communicate the intermediate space with the inside of the gasification chamber. Alternatively, the openings in the chamber may be arranged also in the mantle of the gasification chamber, but the first arrangement or a combination of both of them is preferred in order to prevent the material inside the chamber may clog the openings during the agglomeration process. In this respect, the gas enters the inside of the gasification chamber through openings in the chamber, after the gas injected through the openings of the nozzle goes to the intermediate space. In a preferred embodiment, the gasification chamber has an inlet face and an outlet face, with both faces being partially closed to allow the entrance and controlled discharge of the material.

The gasification chamber is preferably built based on materials that are resistant to the corrosion of gases entering the same, as for example titanium, stainless steel, steel with special coating, high density polymer or any other material that prevents corrosion by pitting of the gasification chamber plate.

According to the embodiment of the invention, the gasification chamber comprises load lifters that allow mixing the material and the gas inside the chamber, as said material moves on due to the rotational movement of the drum combined with the inclination angle it has. The load lifters can be part of the structure of the internal surface of the gasification chamber or be independent elements to allow their replacement if they are impaired due to abrasion and/or corrosion. Said load lifters can be located along the gasification chamber or in other arrangements to facilitate the mixing of the material and the gas inside the chamber, as for example, forming a spiral inlet around the internal surface of the gasification chamber. Along with this, the chamber can include at least one retainer to contain part of the material that enters the chamber and thus allow said material to slide over the retained material and not directly over the chamber surface as the material enters the chamber and to avoid the excess wearing and impairment of said surface for the abrasion due to slip and/or impact of the material. Said at least one retainer is preferably configured as a projecting surface transversally arranged in the whole internal perimeters of the gasification chamber. Like the load lifters, the retainer can be part of the structure of the internal surface of the gasification chamber or be independent elements to allow their replacement in case of impairment.

Continuing with the description of the agglomeration drum, the gasification chamber is connected downstream to an agglomeration chamber to which the material previously mixed with gas in the previous chamber, enters. The flow of material between the gasification chamber and the agglomeration chamber advantageously takes place through an impeller, but it can be directly achieved from the gasification chamber to the agglomeration chamber. In fact, the presence of the impeller allows increasing the differentiation between the gasification chamber and the agglomeration chamber, increasing the residence of the gas in the gasification chamber and also allowing to increasing the material stirring during the transfer from the gasification chamber to the agglomeration chamber. In the preferred embodiment, the impeller is built in between the gasification chamber and the agglomeration chamber and coupled to the main cylinder, so that to turn along with it and, consequently, along with the gasification chamber, where the upstream face of the impeller faces the gasification chamber including its outlet face, and the downstream face of the impeller faces the agglomeration chamber including its inlet face.

According to alternative embodiments of the invention, the impeller has an independent movement both to the gasification chamber and to the main cylinder or is connected to one of them, whether through a transmission system or an independent driver.

The impeller comprises multiple blades, preferably in the form of buckets arranged to receive the mixture of the material as the latter goes down the gasification chamber. In a preferred embodiment of the invention, a front cover is provided over the blades, preferably of circular shape and a smaller diameter than the impeller, leaving openings between one blade and the other and between the impeller perimeter and the cover perimeter, where said front cover is arranged on the impeller face facing the gasification chamber and acts as restrictor of the flow of material, allowing the material to be taken only near the ends of the impeller through its openings. In addition, the impeller blades extend by converging to the center of the impeller along a central axis that faces the agglomeration chamber, where said central axis has a smaller diameter than the front cover directly located upstream. This configuration allows the material taken by the blades to turn with the impeller and, as it reaches greater height, to go down by the blades towards the central axis and then to fall inside the agglomeration chamber. With the front cover it is prevented that the material conveyed in the blades return to the gasification chamber. Likewise, the impeller has a back cover covering part of the blades, so that to prevent the material already contained in the agglomeration chamber to return to the gasification chamber.

According to a preferred embodiment of the invention, the impeller, like the gasification chamber, is preferably built on the basis of corrosion-resistant materials, such as titanium, stainless steel, steel with special coating or any high density polymer.

Regarding the agglomeration chamber and unlike the gasification chamber, this does not correspond to an independent chamber from the main cylinder, but it is comprised of the inner space of said main cylinder. In a preferred embodiment, said inner space of the main cylinder has a coating, preferably of elastomer material and cured to the inside mantle of the main cylinder. Like the gasification chamber, the agglomeration chamber can also include load lifters and/or retainers, whether of the fixed or removable type.

Continuing with the description of the invention, inside the agglomeration chamber an injection of fluid system is configured comprising at least a pipe along the cylinder fed on one end through the discharge chamber and supported on the other end by the central axis of the impeller. Said at least one pipe has multiple openings to dispense the liquid inside the agglomeration chamber. In a preferred embodiment of the invention, the pipes are at least two, injecting different types of fluids inside the agglomeration chamber in different areas thereof. In fact, according to said embodiment, the openings of each pipe can distribute in different forms along thereof, depending on the fluids entering upstream the agglomeration chamber, downstream thereof or along the whole chamber. The distribution of pipes and openings therein allows configuring different options for the injection of fluids in the agglomeration process; therefore, it is possible to define also the type of fluid injected, different types of injection, for example, by dripping or spray, and/or positions of injection provided by the location of openings inside the chamber.

Considering the above, the at least one pipe is connected to the central axis of the impeller by a stationary bracket mounted on a bearing at the impeller's central axis, so that said bracket keeps fixed during the impeller rotation without forcing the torsion of the pipes that transport the liquid. Additionally the system of liquid injection preferably has a protection element in the form of cylindrical mantle and located in the central axis 304 of the impeller, preventing that the material entering the agglomeration chamber from the impeller directly hits the pipes when falling down from the blades to the agglomeration chamber when covering them near the impeller.

Going back to the definition of the discharge chamber, in particular the discharge chute that facilitates the extraction of the aggregate from the agglomeration drum, according to an embodiment of the invention said discharge chute is located at the bottom of the chamber, thus facilitating the solid material from the agglomeration drum to be extracted from the equipment by gravity. In a preferred embodiment of the invention, the discharge chute includes at least one retainer of material similar to that used in the gasification chamber for the material being received at the discharge chamber not falling down directly on the bottom of the discharge chute, preventing its excess wearing due to abrasion and impact. In addition, regarding the exhaust hood that recovers the gases generated inside the main cylinder as a result of the chemical reactions and coming from the gasification chamber—which also have high temperatures and help the extraction process—said exhaust hood is arranged on the upper part of the discharge chute, since said gases tend to raise and not to fall along with the solid material.

Considering the description of components in the agglomeration drum, the agglomeration procedure occurring inside the same comprises a first stage where the mineral is added along with a reagent, for example a solid reagent, inside the agglomeration drum through the inlet of the feeding chute. This way, the mineral and the reagent enter the gasification chamber, where as a result from the drum rotation and helped by the load lifters, the mineral is mixed with the reagent and the gas entering the gasification chamber, for example through the openings of the chamber and through the nozzle openings. This way, a fraction of the gas is fixed to the mineral due to its humidity (preferably 3 to 5%); then, the chemical attack over the material takes place.

As a result of the main cylinder inclination regulated by the inclination system, the material moving inside the gasification chamber along with the not reacted gas, moves on to the impeller where it is raised by the buckets of the blades and transferred by gravity to the agglomeration chamber. In this chamber, the mineral plus the remaining gas are intensely irrigated with water or refining agent sprayed inside the chamber through the pipe of the injection of fluid system. Additionally, the procedure comprises the alternative of irrigating with concentrated sulfuric acid (preferably at 95% purity) through the other pipe of the injection system. In this respect, the addition of water and/or acid inside the agglomeration chamber can be simultaneous or one before the other, depending on the position of openings along the pipes that inject the fluid to the inside of the agglomeration chamber. In a preferred embodiment, the pipe of the injection of fluid system that injects water has openings distributed upstream the agglomeration chamber, while the pipe of the injection system that injects acid ha openings distributed downstream the agglomeration chamber, allowing that water or refining agent can spread to the material circulating through the agglomeration chamber prior to the sulfuric acid entering in contact with the material.

Due to the exothermal reactions between the water and the concentrated sulfuric acid, as well as from the reactions under transformation suffered by the sulfur compounds present in the mineral treated by the presence of sodium chloride, temperatures between 50° C. and 80° C. generate in the agglomeration chamber. In this chamber, the agglomerate of the material is produced and the formation of gas starts as a result of the reaction, which excess, along with the not reacted gas, is collected in the exhaust hood of the discharge chamber and driven to the recirculation system by the driving device and to the gasification chamber by the ducts of gases, so that to combine it with the entering mineral and reagent in a closed recirculation loop.

In addition, the solid agglomerate material moves on to the discharge chamber and goes down the discharge chute to leave the agglomeration drum; said agglomerate material is used in later extractive processes, as leaching.

Once all components of the agglomeration drum have been described in detail, as well as the process taking place inside the same, the chemical process occurring in the agglomeration procedure performed in said drum is described.

In the procedure of the invention a pre-treatment is made using the agglomeration drum; this allows achieving the chemical transformation of the reaction products in soluble metallic polysulfides and sulfur compounds bound to sodium, that prevent the formation of elementary sulfur with a liquid and gaseous porosity significantly higher than that found in a sulfate medium.

From the point of view of the operation, in the process of the invention an unequivocal sequence of proper additions is followed under the following order:
    i) Mineral,
    ii) Solid sodium chloride, iii) Water (refining agent, fresh water, seawater or a combination thereof), and
iv) Concentrated sulfuric acid.

During said pre-treatment of the mineral, the following reactions take place:

$$4NaCl+4H_2SO_4 \leftrightarrows 4NaHSO_4+4HCl \quad (1)$$

$$4NaHSO_4+4NsCl \leftrightarrows 4Na_2SO_4+4HCl \quad (2)$$

At temperatures below 50° C., reaction (1) tends to occur, while above this temperature the global reaction (2) occurs and the following global reaction (3) takes place:

$$2NaCl+H_2SO_4 \leftrightarrows NaHSO_4+2HCl \quad (3)$$

When reaction (3) takes place, the formation of elementary sulfur is prevented, which formation of sulfur, according to experimental observations, is an actual barrier in the later leaching process, whether a stirred leaching process, in vats, piles or hydrowashers.

The inventors of this application have observed that for said reaction (3) to take place the addition of NaCl should be proportional to the total content of sulfur in the mineral, i.e. the addition will be greater as the total content of sulfur in the mineral increases. Likewise, the iron present in the mineral plays an important role in the crystalline morphology of the sodium sulfate. According to the DRX and SEM analyses, pyrite ($FeS_2$) and pyrrhotite (FeS) contained in the mineral or n the concentrate promote a crystalline structure of the needle type and in its absence a more acicular crystalline structure is observed (see FIG. 13). This crystalline structure is a very important structure for the process of the present invention, since the needle type structure has been associated with a more porous material, which presence allows the liquid/gaseous permeability to increase in the later leaching and, with this, the kinetics of the extraction of the metal contained in the mineral or concentrate also increases.

In an experimental study a sample of chalcopyrite concentrate was used with a Copper content about of 83% and particle size below 74 mm. In this study, cyclic voltammetry trials were conducted using potentiostat-galvanostat equipment (CH-Instruments, Model 1140). With software of the same equipment for the capture of data the compounds formed with a concentrate could be contrasted, subject and not subject to pre-treatment.

The following electrodes were used in the cyclic voltammetry:

Working electrode: carbon paste electrode (CPE) with chalcopyrite mineral or its concentrate.
Reference electrode: Ag/AgCl (E=0.220 WENH)

According to that reported in FIG. 14 and in agreement with that observed by other investigators [Lázaro, 1995; al, 2000; Mikhlin, 2004; Zeng, 2011; Ghahremaninezhad, 2013; Eghbalnia, 2011; Price, 1986], the A1 peak of the graph would correspond to the partial oxidization of chalcopyrite in an intermediate structure described by the following equation (5):

$$CuFe_2 \rightarrow Cu_{1-x}Fe_{1-y}S_{2-z}+xCu^{2+}+yFe^{2+}+zS+2(x+y)e- \quad (5)$$

The A2 peak can be associated to the oxidization of chalcocite with copper-weak non stoichiometric sulfur ($Cu_{2-x}S$) [Price, 1986]. If the load associated with the A2 peak is equal to that of C3 and C4 peaks, the value of x could probably be very near 1, with covellite (CuS) being formed as the main product [Lázaro, 1995; Lu, 2000; Mikhlin, 2004]. Therefore, the A2 peak can be associated with the following reaction (6):

$$Cu_2S \rightarrow Cu_{2-x}S+xCu^{2+}+2xe- \quad (6)$$

According to that recently proposed, the A2 peak can also correspond to the oxidization of the polysulfide formed in A1 peak according to the following reaction (7) [Eghbalnia, 2011]:

$$Cu_{2-x}Fe_{1-y}S_2 \leftrightarrows Cu_{1-x-z}S_2+zCu^{2+}+(1-y)Fe^{2+}+2(1-y+z)e- \quad (7)$$

According to that proposed by some investigators, the A3 peak corresponds to the oxidization of $H_2S$ to SO. In addition, all the metallic copper formed in the cathodic sweep will be oxidized to $Cu^{2+}$ in this region of potentials [Pric, 1986; Lu, 2000].

The C1 and C2 peaks reflect the reduction of products formed at A1 and A2 peaks. The differences of area among the anodic A1 and A2 peaks and the cathodic C1 and C2 peaks indicate that the reaction is not fully reversible. This observation is consistent with the results suggested by other investigators [Lázaro, 1995; Lu, 2000]. Therefore, both peaks observed can associate with the reduction of polysulfides formed.

Additionally, the C3 reduction peak is ascribed to the reduction of the chalcopyrite that was left without reaction, forming talchanite ($Cu_9Fe_8S_{16}$) or bornite ($Cu_5FeS_4$) according to the following equations (8) and (9) [Siegler, 1976; Lázaro, 1995; Lu, 2000; Eghbalnia, 2011].

$$9CuFeS_2+4H^++2e- \rightarrow Cu_9Fe_8S_{16}+Fe^{2+}+2H_2S \quad (8)$$

$$5CuFeS_2+12H^++4e- \rightarrow Cu_5FeS_4+4Fe^{2+}+6H_2S \quad (9)$$

At more negative potentials than the C3 peak, chalcocite ($Cu_2S$) is formed, where iron is completely eliminated from the structure of chalcopyrite as shown by the equation (10), which confirms that stated by some authors [Eghbalnia, 2011; Zeng, 2011] and it would represent the C4 peak.

$$2CuFeS_2+6H^++2e- \rightarrow Cu_2S+2Fe^{2+}+3H_2S \quad (10)$$

According to that shown in FIGS. 15 and 16, as the presence of chloride ion increases in the solution, the amplitude of A1 peak also increases, which is an indication that the compound is more conductor and, consequently, it would be less amorphous.

Additionally, the increased intensity of current would mean a greater mass formation of the compound.

In the oxidization sweep it is observed that the compounds formed at the different concentrations of chloride are the same. However, the single compound showing a change in its crystallinity is A1 peak, which corresponds to the formation of the non-stoichiometric polysulfide of Cu—Fe—S that forms according to reaction (1) suggested by several investigators. The two waves observed in some A1 peaks, would give account of an incomplete oxidization or oxidization in two stages; said observation was previously suggested by several investigators [Lázaro, 1994; Stankovic, 1986]. Stankovic proposed that these two stages can be described according to reactions (11) and (12) with a slow and fast kinetics, respectively.

$$nCuFeS_2 \leftrightarrow Cu^{2+}+_Fe_nS_{2n}+2e- \quad (11)$$

$$CuFeS_2 \leftrightarrow Fe^{3+}+Cu_{n-1}Fe_{n-1}S_{2n}+5e- \quad (12)$$

According to FIG. 15 in relation to the formation of compounds at 70° C., a similarity is observed with that occurring at 25° C., but the intensity of peaks current under oxidization is greater at 70° C. compared with that obtained at 25° C.; this indicates a significant improvement of the amount of matters transformed. It can be also noted that the A3 peak of sulfur formation is not detected probably due to its fast transformation into ion sulfate favored by high temperature and the action of the ion sodium.

The greater rest time favors more oxidative conditions in the concentrate. Likewise, the reduction reactions produced in the chloride medium occur with a lower intensity of current, which could be associated with a greater solubility of the compounds formed in the medium. According to the results previously analyzed, it can be summed up that:

- The increase of chloride concentration at any temperature promotes the formation of polysulfides with greater crystallinity.
- The reduction of intensity in the peak current of copper polysulfide formation with the increase of the ion chloride would be related to a greater solubility in the aqueous medium.
- At a greater temperature and in the presence of any concentration of the chloride ion, the formation of a copper polysulfide of greater crystallinity and solubility is favored in the respective medium, as well as the oxidization of the elementary sulfur to sulfate ion.

With a greater rest time of the concentrate and pretreatment with $H_2SO_4$—NaCl, a greater solubility of the copper polysulfide in the aqueous medium is favored, which conduct would be related to the decrease of current intensity.

The best results for the extraction of copper from chalcopyrite concentrates can be achieved after pretreatment, 30 days of rest and stirred leaching or in drums at 70° C. Under these conditions, the formation of elementary sulfur and insoluble metallic sulfides is prevented, favoring the leaching yield after the sample of mineral.

The DRX analyses, FIG. 17-a, show that the concentrate without pretreatment shows the presence of elementary sulfur in the layer of reaction products. However, the sample of concentrate subject to this pretreatment, FIG. 17-b, does not show the presence of this element, which in this case is forming a compound of the type $Na_2S$, stating the importance of the ion sodium.

For the analysis of the morphology of the reaction products formed by the pretreatment in a $H_2SO_4$ and in $H_2SO_4$—NaCl medium, images of samples of chalcopyrite concentrates through SEM are obtained at different rest times.

FIGS. 18 to 20 show the importance of the rest to fix the ion sodium to the layer of products. In fact, it is observed that after 30 days of rest, it is possible to identify the presence of this ion through the SEM analysis, which, compared with the DRX analysis shown in FIG. 17, suggests the formation of compounds of sulfides and sulfates of sodium. In addition, in the reaction products there is no presence of the chlorine element or compounds in which it participates. This would validate the occurrence of reaction (13).

$$2NaCl + H_2SO_4 \rightleftarrows Na_2SO_4 + 2HCl \quad (13)$$

The formation of sodium sulfate or other sulfur-associated compounds during pretreatment would be associated with the generation of gaseous HCl. This compound could easily spread through the pores of the products formed in order to continue with the transformation of chalcopyrite in high solubility copper polysulfides, with chlorine being detached in gaseous form.

The results obtained allow answering the question of why there are significant differences in the extraction copper from a chalcopyrite concentrate (see FIG. 21), when the pretreatment of the concentrate is included, as well as the influence of the solid sodium chloride dose per ton of concentrate treated.

The concentrate without pretreatment is practically insoluble in an acid solution at pH=2 and 60 g L−1 in the leaching solution. With 15 kg NaCl/ton of concentrate and 20 h rest, an extraction of copper of 80% is achieved after 25 h of leaching. This kinetics of extraction can significantly increase if the rest time increases. Likewise, the rest time can substantially decrease if the pretreatment is conducted in a closed reactor.

BRIEF DESCRIPTION OF FIGURES

As part of the present invention the following figures are shown, which are representative of the invention and which present preferred embodiments thereof and, therefore, they should not be considered as limiting the invention.

DETAILED DESCRIPTION OF THE PREFERRED EMBODIMENTS

Figure 1:
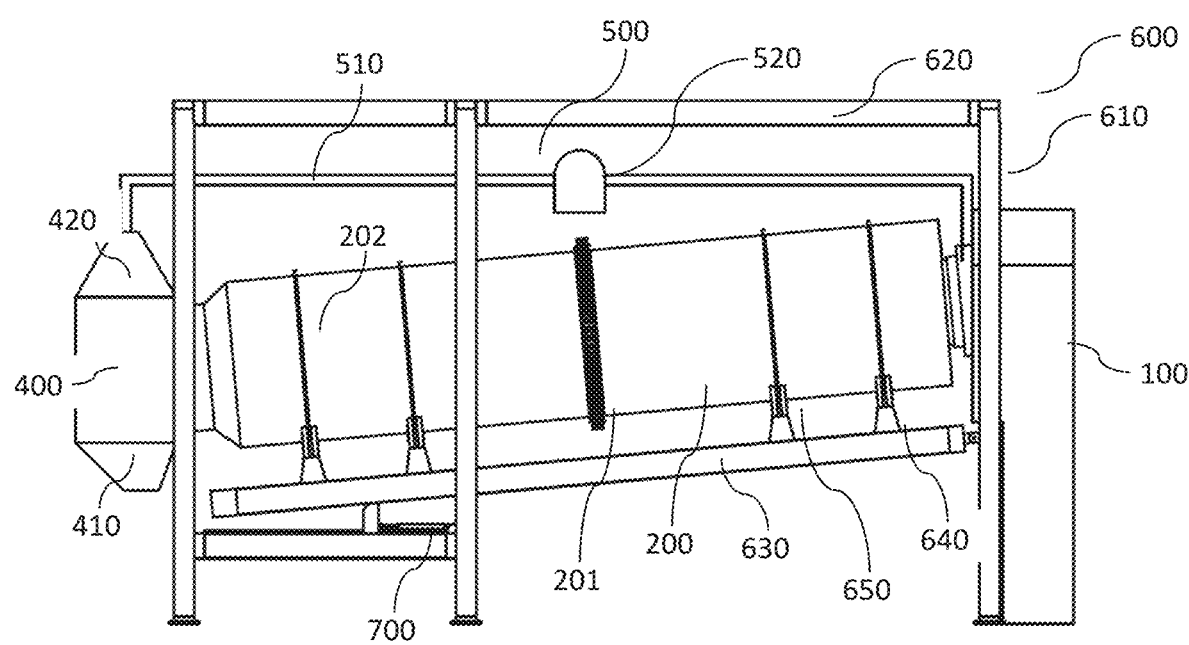
FIG. 1. It shows a scheme representing en embodiment of the agglomeration drum of the invention from the side.

FIG. 1 illustrates a preferred embodiment of the agglomeration drum, which is the object of the present invention and comprising a feeding chute 100 located upstream in one of its ends to receive the material to be introduced to the agglomeration drum that is preferably inclined and divided in two separate sections by a rack 201. In this respect, a first section of the agglomeration drum is located upstream the rack 201 and a second section of the agglomeration drum, is located downstream the rack 201.

In the end opposite to the feeding chute 100, i.e. in the downstream end, there is a discharge chamber 400 for the evacuation of heavy material and the extraction of gases generated and/or being present inside the agglomeration drum. For this double function to be performed, the discharge chamber 400 is comprised of a discharge chute 410 preferably located at the bottom of the discharge chamber and of an exhaust hood 420 preferably located at the upper part of the discharge chamber, where the exhaust hood is connected to a gas recirculation system 500, which according to the present embodiment comprises a duct for the conveyance of gases 510, which leads the gases extracted by the exhaust hood 420 again to the inside of the agglomeration drum, preferably at the inlet of material area to the agglomeration drum, Le. in the upstream end thereof. In this context, according to a preferred embodiment of the invention, the conveyance of gases to the inside of the duct 510 is performed by a fan 520 that extracts the gases from the downstream end of the agglomeration drum and inject them in the upstream end of said drum.

Still with FIG. 1, it is observed that the agglomeration drum comprises a main cylinder 200 preferably built of a very thick rolled steel plate, which is supported by a supporting structure 600 mainly made up by feet 610 joint by an upper beam 620 and a lower beam 630 pivoting on one of the feet 610, where said lower beam has drum brackets 640 that support the main cylinder 200 through wheels 202 arranged in the external mantle of the main cylinder 200.

The main cylinder 200 of the agglomeration drum rotates over its axial axis driven by a driving device or engine (not shown) comprising means to engage with the rack teeth 201, transmitting the engine rotation to said rack 201 and allowing the drum to rotate in a controlled manner over the wheels 650.

In a preferred embodiment of the invention, the agglomeration drum of the invention also has an inclination system 700 to modify the inclination thereof in a controlled manner over the horizontal axis and, therefore, to be able to adjust the residence time of the material inside the drum. According to the preferred embodiment shown in FIG. 1, said inclination system 700 acts on the lower beam 630, which pivots in its connection with at least one foot 610 and changing the inclination of the drum.

Figure 2:
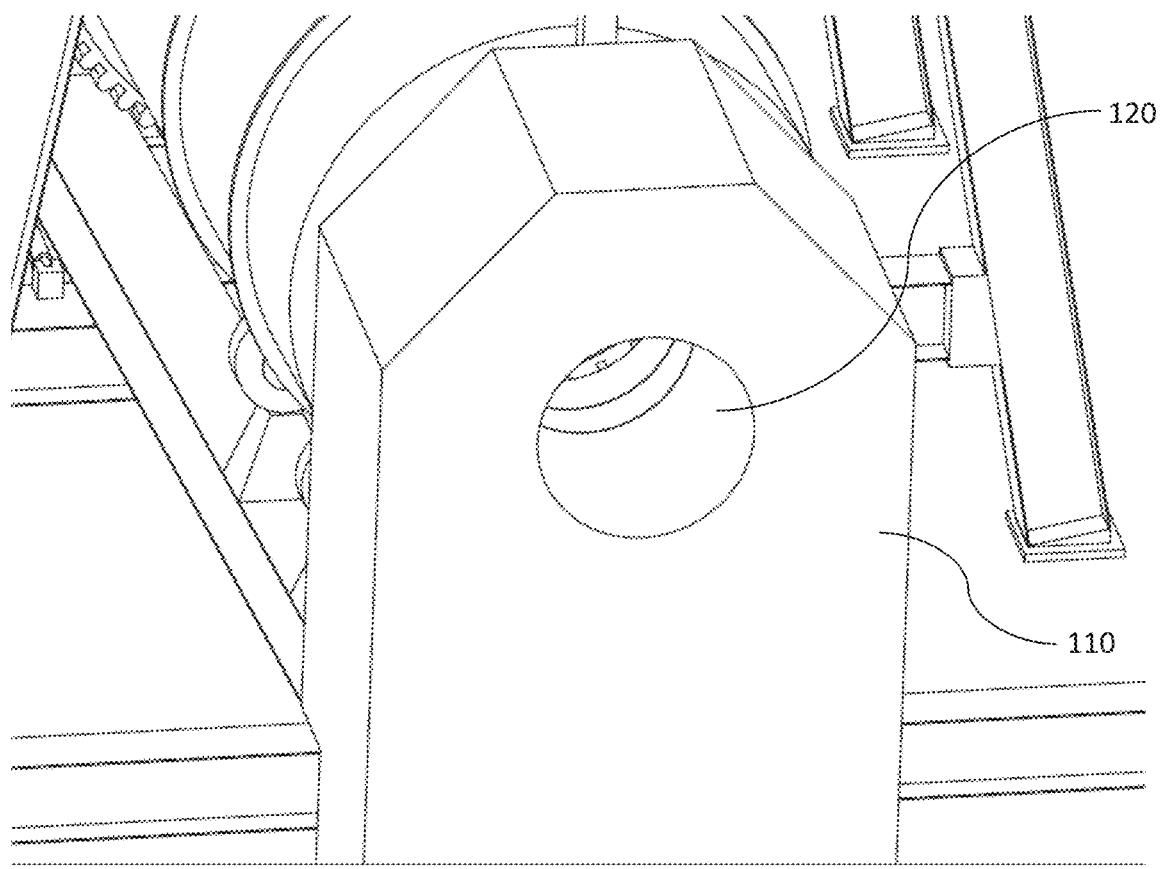
FIG. 2. It shows an external view of the feeding chute according to an embodiment of the invention.

According to FIG. 2, the feeding chute 100 consists in a rigid foot 110, where an inlet opening 120 is configured, preferably circular and arranged in the higher area of the equipment upstream the agglomeration drum. Through this opening, the solid material generally coming from a conveyor belt enters the agglomeration drum.

Figure 3:
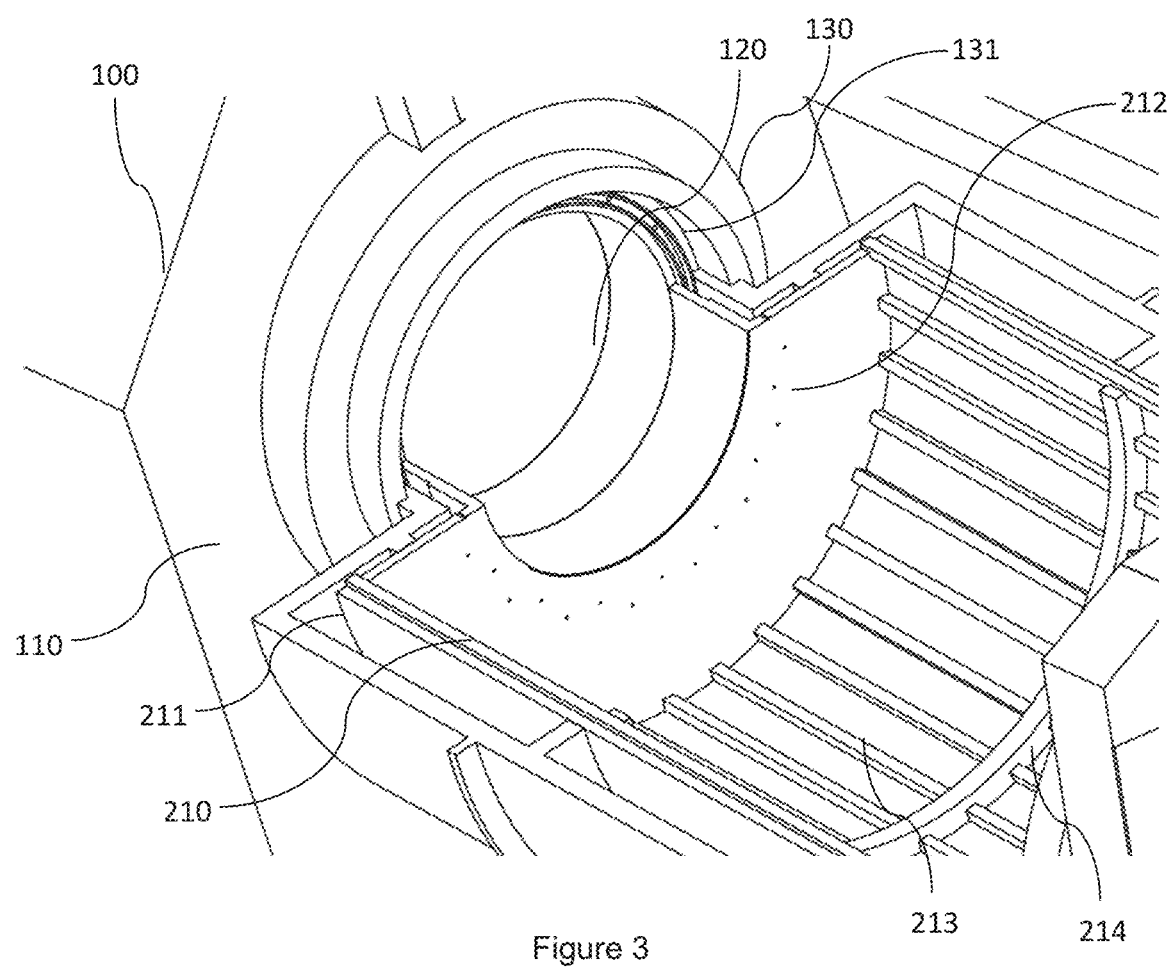
FIG. 3. It shows a view of the inlet to the gasification chamber in a longitudinal cross-section according to an embodiment of the invention.

As illustrated by FIG. 3, the inlet opening 120 of the feeding chute 100 is in direct communication with the first section of the cylinder where a gasification chamber 210 exists. This chamber preferably has a cylindrical separate and concentric surface being concentric to the mantle of the main cylinder 200, but both elements are joined, so that to rotate together preferably forming an intermediate space 211 between the gasification chamber 210 and the mantle of the main cylinder 200. The gasification chamber 210 also has a preferably circular inlet and concentric to the inlet opening of the feeding chute 100, where said inlet abuts an injection nozzle 130 fixed to the rigid column 110 of the chute and over which both the main cylinder 200 and the gasification chamber 210 rotate. This injection nozzle 130 allows connecting the gasification chamber 210 to the feeding chute 100 and also allows the gas to enter inside said chamber. To this effect, the injection nozzle 130 has openings in the nozzle 131 allowing the gas to enter to the intermediate space 211 formed between the main cylinder 200 and the gasification chamber 210.

In addition, the gasification chamber 210 has chamber openings 212 preferably located in the chamber's inlet face. Alternatively, the chamber openings 212 may be also arranged in the mantle of the gasification chamber 210, but the first arrangement or a combination of both is preferred, so that to prevent the material provided inside the chamber to clog the openings. In this respect, the gas enters inside the gasification chamber through the chamber opening 212 after the gas injected through the nozzle openings 131 goes to the intermediate space 211.

The gasification chamber 210 is preferably built based on corrosion-resistant materials entering therein, as for example titanium, stainless steel, steel with special coating, high density polymer or any other material that prevents corrosion by pitting of the gasification chamber plate.

Figure 4:
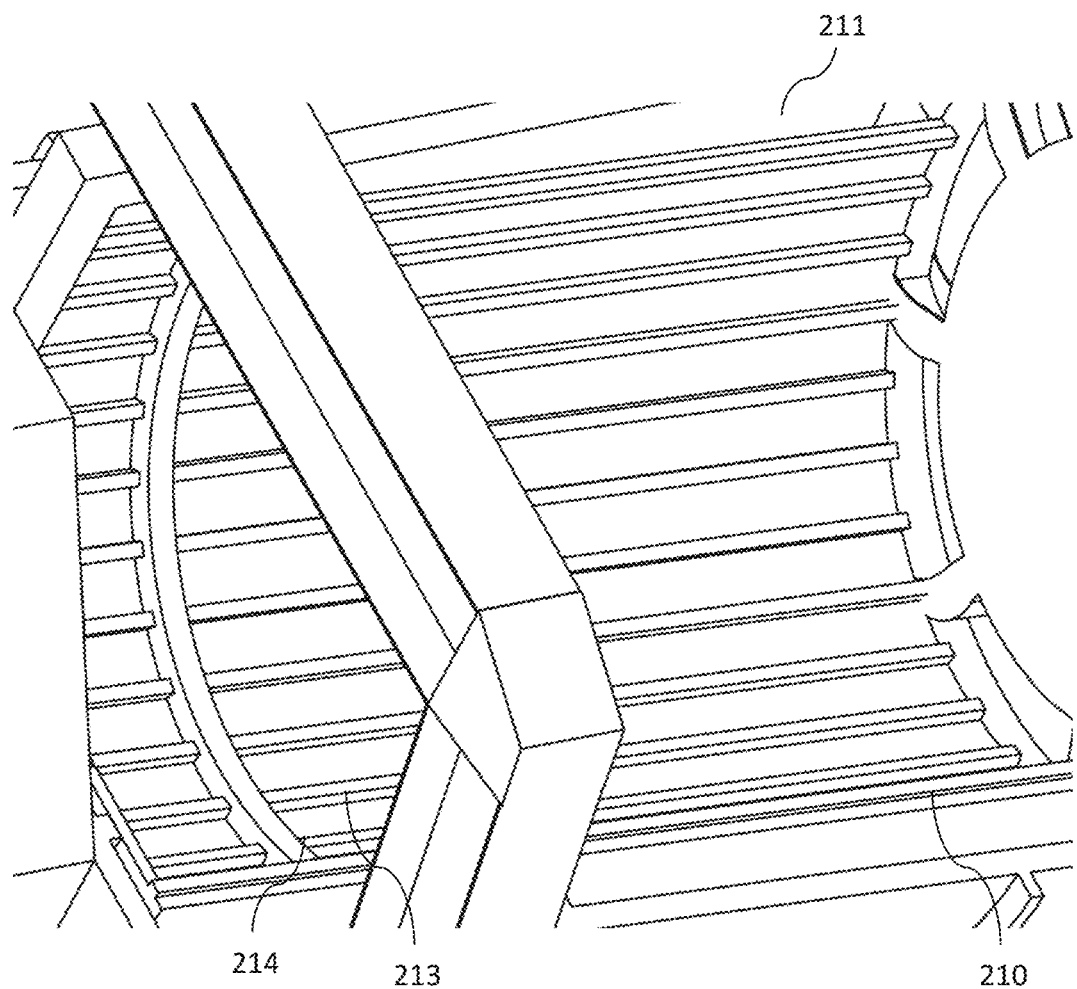
FIG. 4. It shows a view of the gasification chamber in a longitudinal cross-section according to an embodiment of the invention.

According to the embodiment shown in FIG. 4, the gasification chamber comprises load lifters 213 that allow mixing the material and the gas inside the chamber, as said material moves on due to the rotational movement of the drum combined with the inclination angle it has. The load lifters 213 can be part of the structure of the internal surface of the gasification chamber or be independent elements to allow their replacement if they are impaired. Said load lifters 213 can be located along the gasification chamber 210 or in other arrangements to facilitate the mixing of the material and the gas inside the chamber, as for example, forming a spiral around the internal surface of the gasification chamber.

Along with this, the chamber includes at least one retainer 214 to contain part of the material that enters the chamber and thus allows said material to slide over the retained material and not directly over the chamber surface as the material enters the chamber, thus avoiding the excess wearing and impairment of said surface. Said at least one retainer 214 is preferably configured as a projecting surface transversally arranged in the whole internal perimeter of the gasification chamber 210. Like the load lifters 213, the retainer 214 can be part of the structure of the internal surface of the gasification chamber or be independent elements to allow their replacement in case of impairment.

Figure 5:
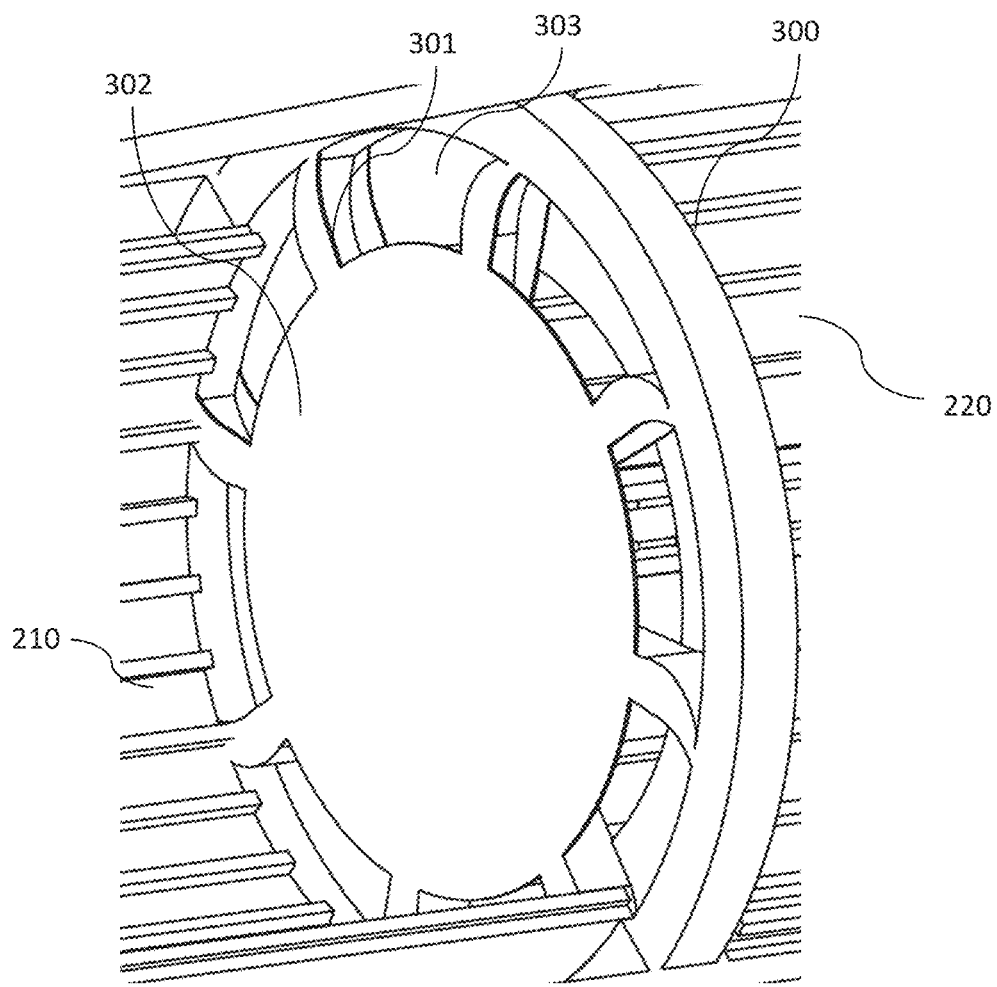
FIG. 5. It shows a view of the impeller from the material loading face from the gasification chamber according to an embodiment of the invention.

According to an aspect of the invention shown in FIG. 5, the gasification chamber 210 is connected downstream to an agglomeration chamber 220 to which the material previously mixed with gas in the previous chamber, enters. The flow of material between the gasification chamber 210 and the agglomeration chamber 220 advantageously takes place through an impeller 300, which can be present or not according to the embodiment of the invention. This element is built in between the gasification chamber 210 and the agglomeration chamber 220 and coupled to the main cylinder 200, so that to turn along with it and, consequently, along with the gasification chamber.

Viewed from the gasification chamber 210 side, the impeller 300 comprises multiple blades 301 in the form of buckets arranged to receive the mixture of the material while it goes down the gasification chamber 210. Over the blades 301 there is a front cover 302, preferably of circular shape and a diameter lesser than the impeller, where said front cover acts as restrictor of the flow of material, allowing the material to be taken only near the ends of the impeller through its openings 303.

Figure 6:
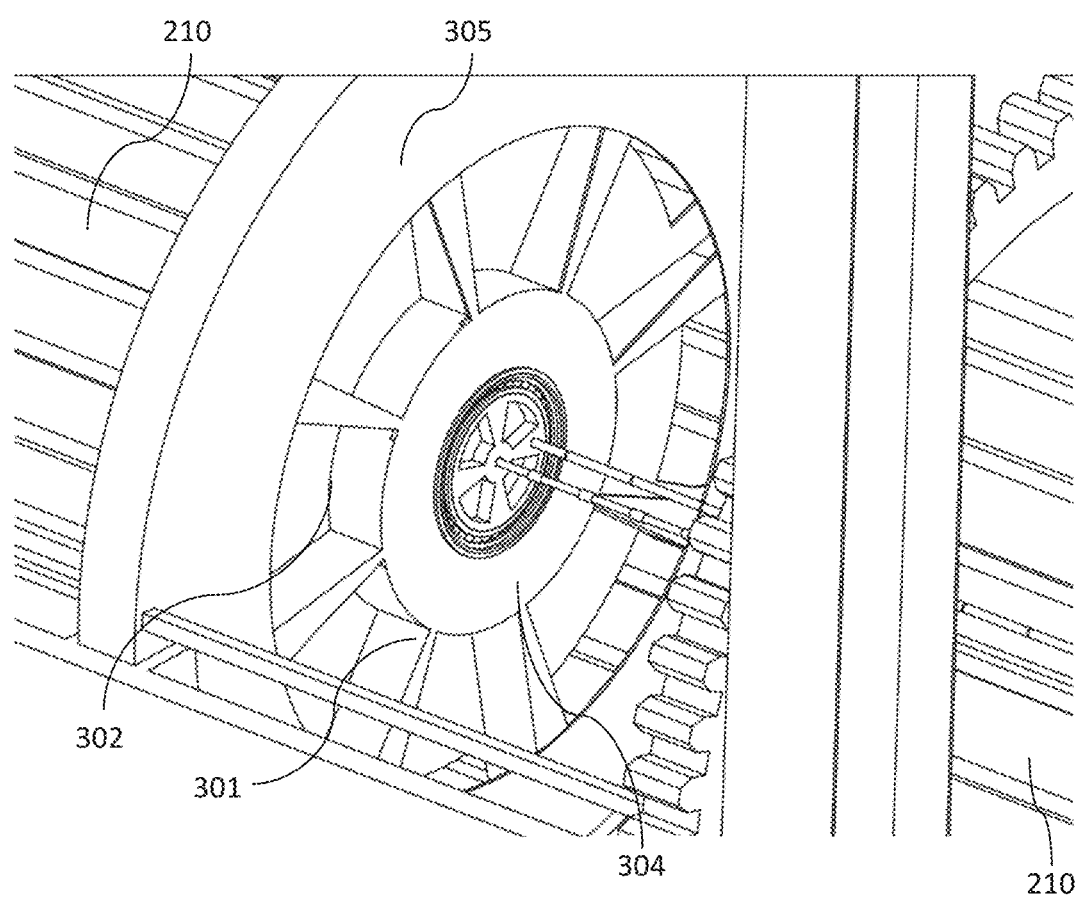
FIG. 6. It shows a view of the impeller from the material unloading face to the agglomeration chamber according to an embodiment of the invention.

Now viewed from the agglomeration chamber (FIG. 6) it is observed that the blades converge to the center of the impeller along a central axis 304 of a lesser diameter than the front cover 302 directly located upstream. This configured allows the material taken by the blades to turn with the impeller and, as it reaches greater height, to go down by the blades towards the central axis 304 and then to fall inside the agglomeration chamber. With the front cover 302 it is prevented that the material conveyed in the blades return to the gasification chamber. Likewise, the impeller has a back cover 305 covering part of the blades 301, so that to prevent the material already contained in the agglomeration chamber 220 returning to the gasification chamber 210 either.

The impeller 300, like the gasification chamber 201, is preferably built on the basis of corrosion-resistant materials, such as titanium, stainless steel, steel with special coating or any high density polymer.

Figure 7:
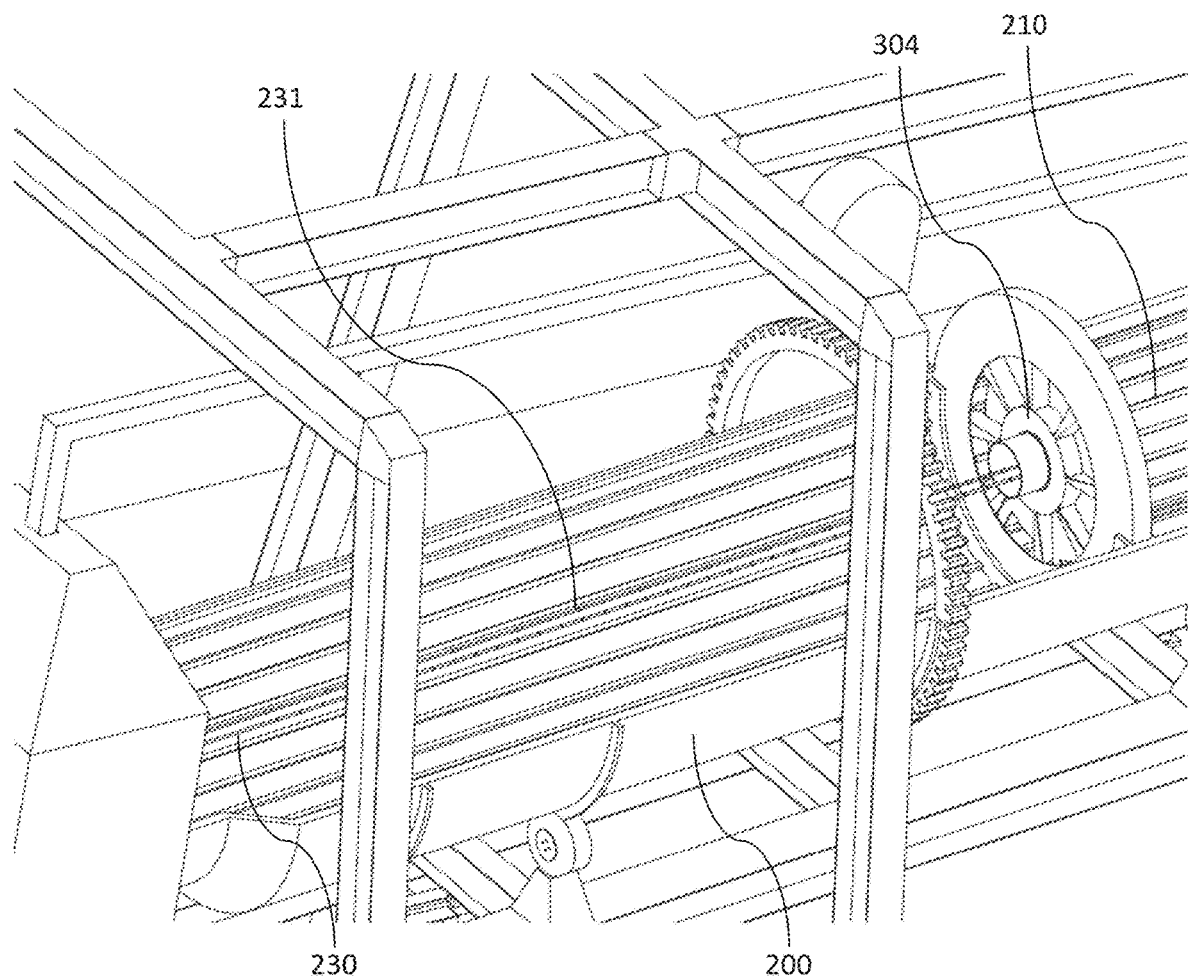
FIG. 7. It shows a view of the agglomeration chamber in a longitudinal cross-section according to an embodiment of the invention.

FIG. 7 shows a view of the agglomeration chamber 220, which unlike the gasification chamber 201, does not correspond to an independent chamber from the main cylinder 200, but it is comprised of a coating, preferably of elastomer material and cured to the inside mantle of the main cylinder 200. Like the gasification chamber 210, the agglomeration chamber 220 can also include load lifters and/or retainers, whether of the fixed or removable type.

A relevant aspect of the invention is that inside the agglomeration chamber 230 there is an injection of fluid system comprised of two pipes 230, 231 along the cylinder, fed on one end through the discharge chamber 400 and supported on the other end by the central axis 304 of the impeller. Said pipes have multiple openings to dispense the liquids inside the agglomeration chamber, where said openings can distribute in different forms along the pipes, depending on the fluids entering upstream the agglomeration chamber, downstream thereof or along the whole chamber.

Figure 8:
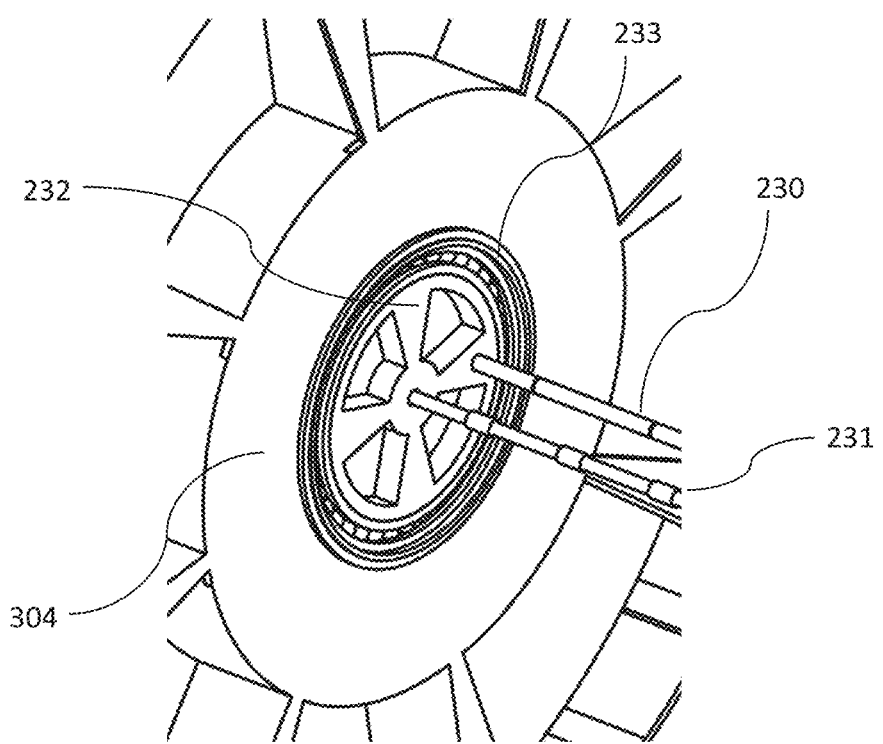
FIG. 8. It shows a view of the stationery bracket at the central axis of the impeller and that supports the injection of fluid system according to an embodiment of the invention.
Figure 9:
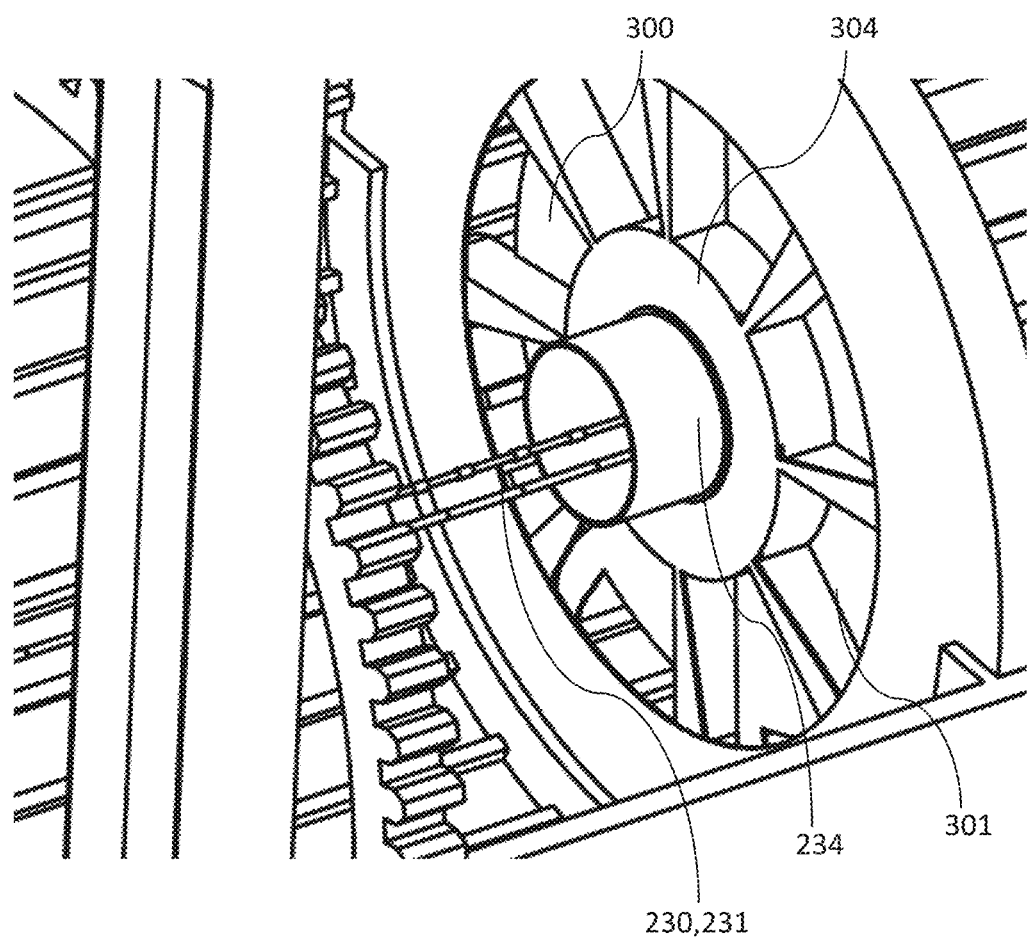
FIG. 9. It shows a view of the impeller from the material unloading face including the protecting element at the central axis of the impeller according to an embodiment of the invention.

FIG. 8 shows a preferred embodiment of the invention where pipes 230, 231 connect to the central axis 304 of the impeller by a stationary bracket 232 mounted on a bearing 233, so that said bracket keeps fixed during the impeller rotation without forcing the torsion of the pipes that transport the liquid. Additionally the system of liquid injection preferably has a protection element 234 preferably in the form of a cylindrical mantle (FIG. 9) and located in the central axis 304 of the impeller, preventing that the material directly hits the pipes when falling down from the blades 301 of the impeller 300 towards the agglomeration chamber 220.

Figure 10:
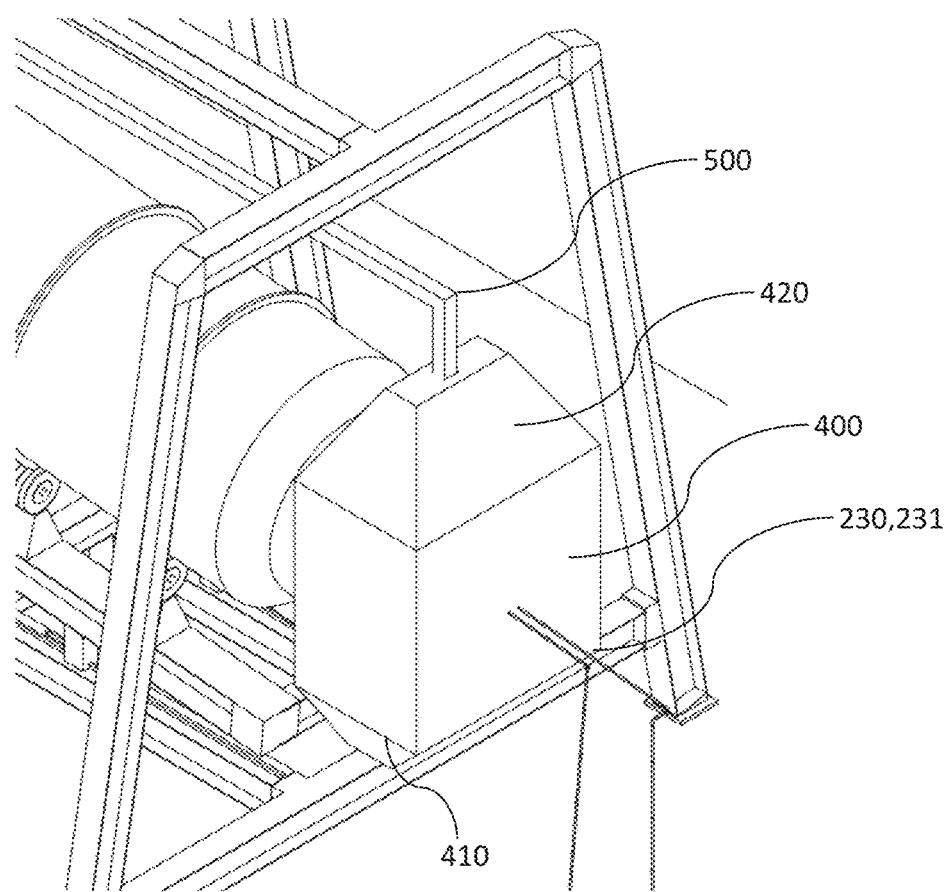
FIG. 10. It shows an external view of the discharge chamber according to an embodiment of the invention.

The discharge chamber 400 is illustrated with further detail in FIG. 10. It is observed that it comprises two parts. First, the discharge chute 410 located at the bottom, through which the solid material coming from the agglomeration drum is extracted from the equipment. In a preferred embodiment of the invention, in the area for the discharge of material, at least one retainer of material is included similar to that used in the gasification chamber for the material being received at the discharge chamber 400 not falling down directly on the bottom of the discharge chute 400, preventing its excess wearing.

Second, the exhaust hood 420 recovers the gases generated inside the main cylinder 200 as a result of the chemical reactions and coming from the gasification chamber, which also have high temperatures and help the extraction process. This is why the exhaust hood 420 is arranged on the upper part of the discharge chute 400, since said gases tend to raise and not to fall along with the solid material. For the extraction to be complete without the possibility of gases to escape, a proper ventilation system is included for the conveyance of said gases. Likewise, the duct for the conveyance of gases 510 that transports gases from the exhaust hood 420 towards the gasification chamber should have the necessary conditions to withstand the conveyance of these gases, which generally contain acids and humidity. In addition, and in order to prevent problems with the macroparticles taken by the extraction, the invention comprises a particle filter that can be an electrostatic precipitator, a membrane filter or any other type of filter, which by being installed before the fan 520, preferably in the duct of gases 510 and/or in the exhaust hood 420, allows to retaining the particles of the material that are suck in by the fan and, with this, preventing their getting in contact with the fan and/or reentering a gasification chamber along with the gas. This could result in the possible clogging of the nozzles openings 130 and/or chamber 212. In this context, the fan 520 provided in the duct of gases 510 has in turn the function of driving the recirculated gases, extracting said gases from the agglomeration chamber 220 through the exhaust hood 420 and injecting the gases to the gasification chamber 210 through the set of openings 130 and 212.

Figure 11:
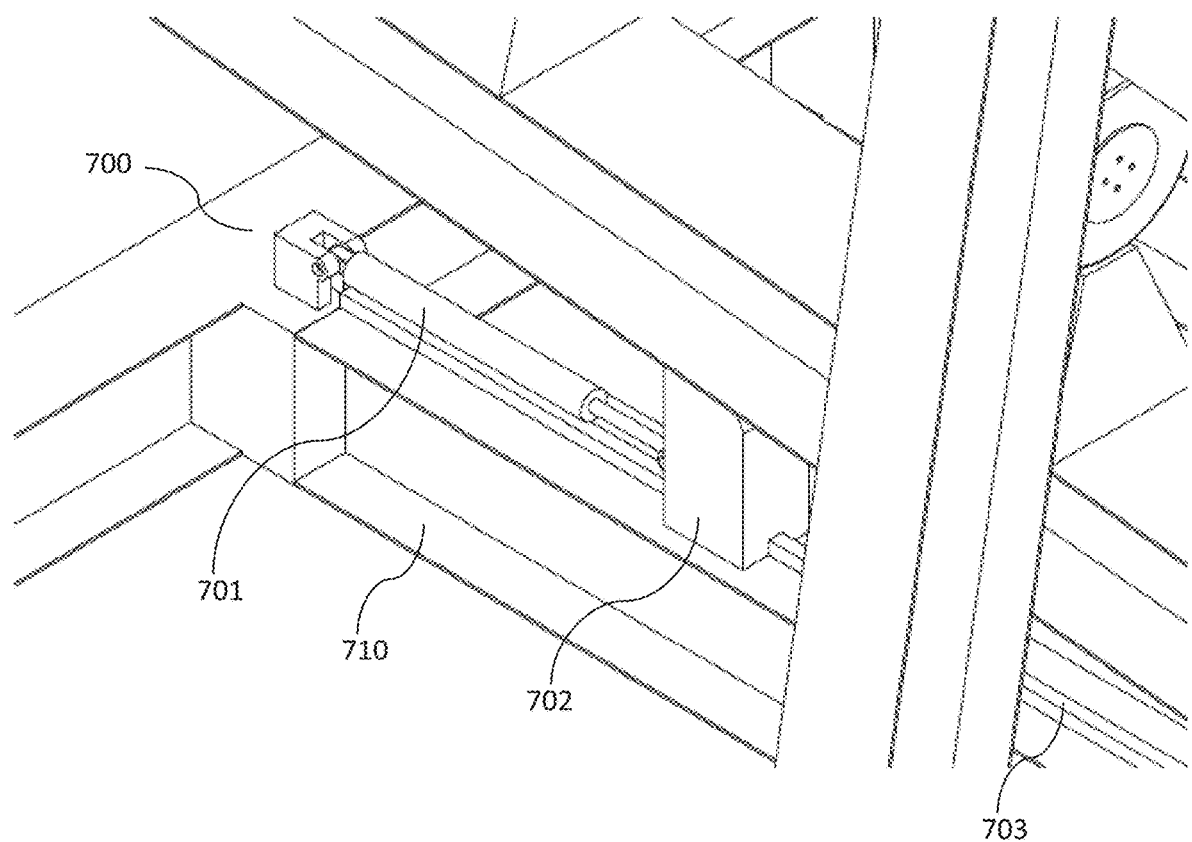
FIG. 11. It shows a view of the inclination system according to an embodiment of the invention.

According to FIG. 11, the inclination system 700 consists in a pair of hydraulic cylinders 701, with each of them being located in a lifting beam 710 provided on each side of the drum. The hydraulic cylinders 701 drive one wedge 702 horizontally, over which the lower inclined beam 630 rests that supports the main cylinder 200. Said wedge displaces over a rail 703, so that its displacement makes the lower beam 630 to pivot on one of the feet 610 of the supporting structure, thus varying its inclination and allowing the control of the retention and circulation of the material inside the drum in order to obtain a more efficient product.

Figure 12:
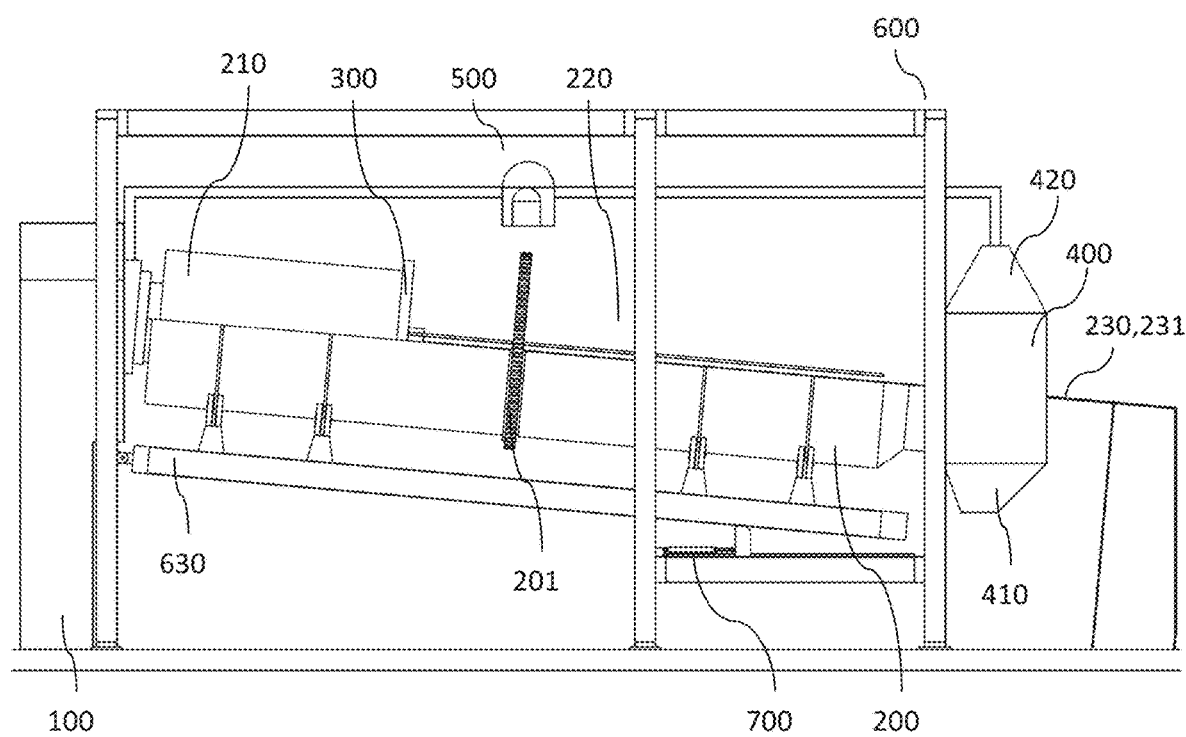
FIG. 12. It shows a scheme representing the agglomeration drum in vertical longitudinal cross-section, where the main cylinder is also represented with a horizontal longitudinal cut, allowing to viewing the inside of the agglomeration drum.
Figure 13:
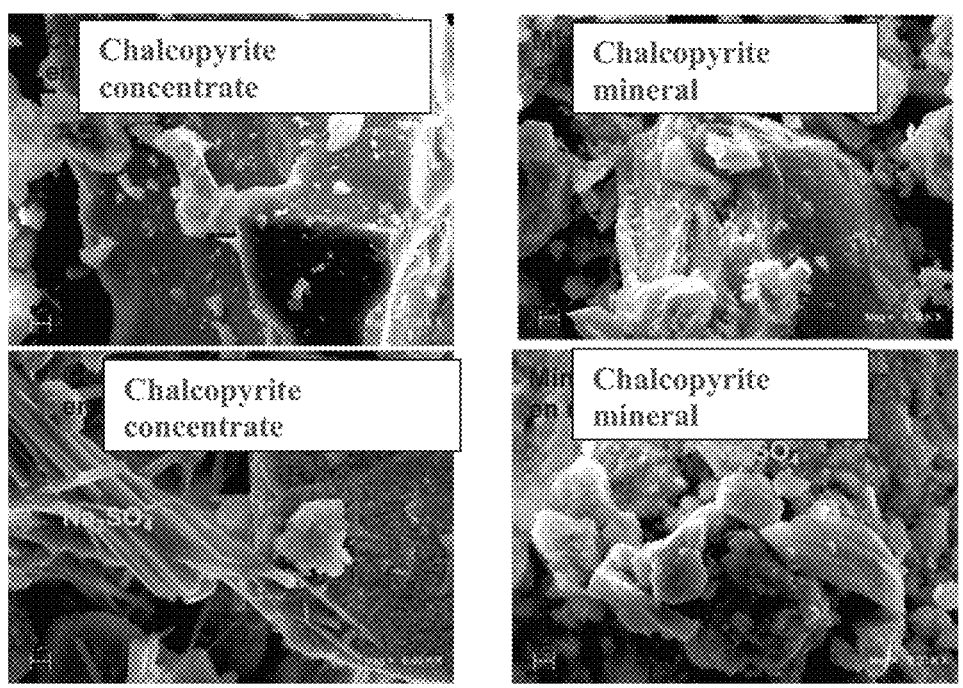
FIG. 13. Microphotograph showing the formation of sodium sulfate over mineral particles and chalcopyrite concentrate (6000×) with 15 kg NaCl/ton of mineral and 20% $H_2SO_4$ over stoichiometric consumption.
Figure 14:
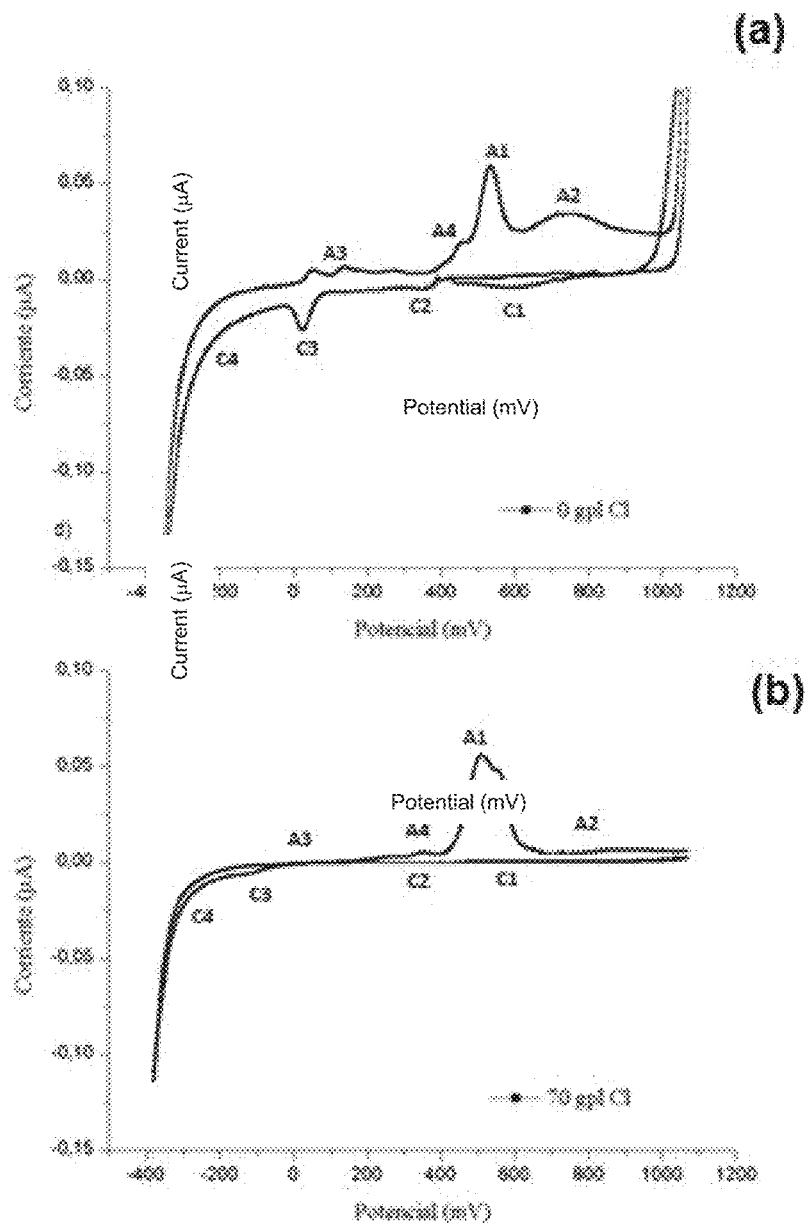
FIG. 14. Chart reflecting the cyclic CEP-CPY voltammetry without pre-treatment in a solution of $H_2SO_4$ 0.1 M, at 25° C. with: a) 0 g/l of Cl⁻ and b) 70 g/l of Cl⁻
Figure 15:
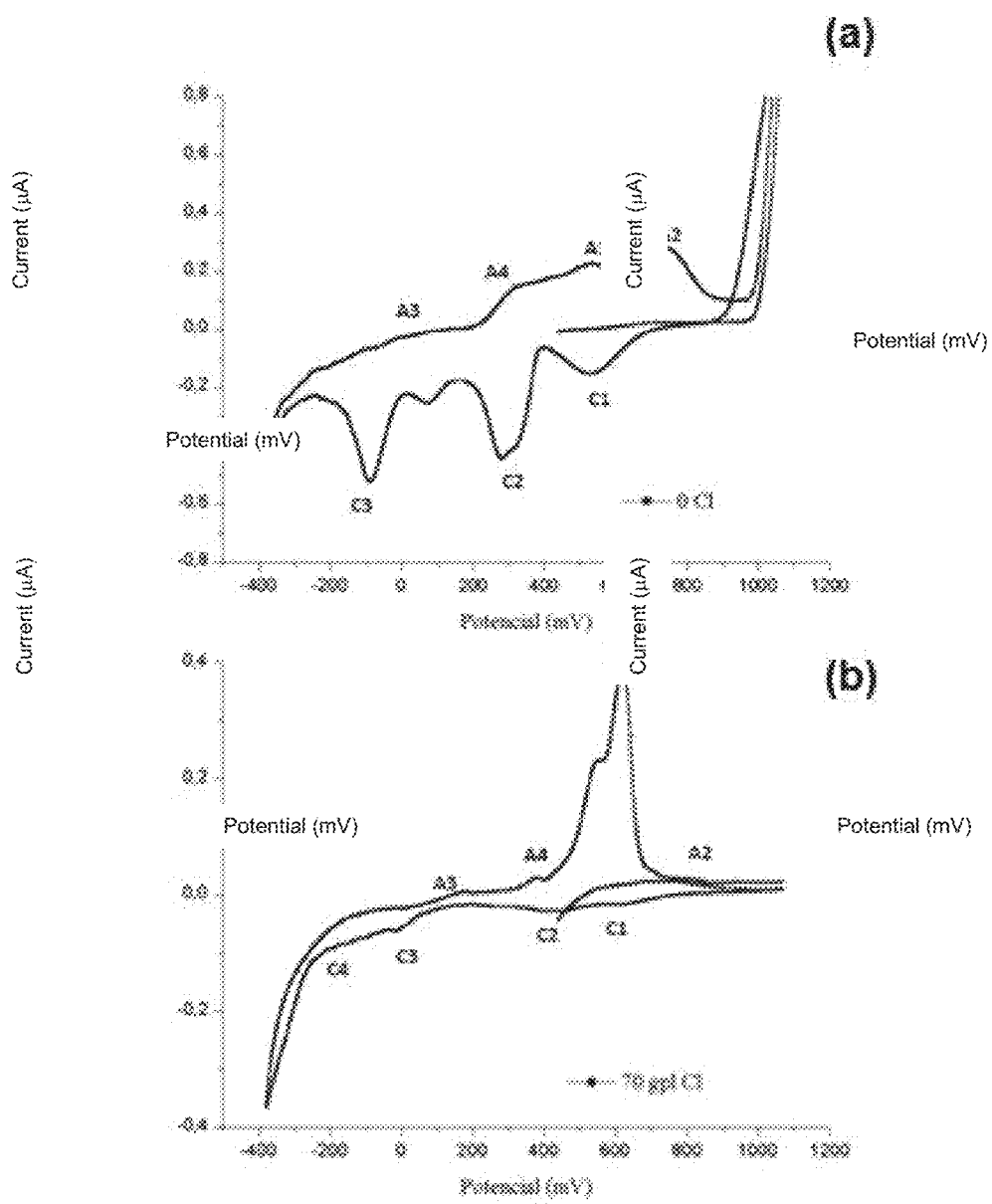
FIG. 15. Chart reflecting the cyclic CEP-CPY voltammetry with pre-treatment in $H_2SO_4$—NaCl during 15 days rest in a solution of $H_2SO_4$ 0.1 M, at 25° C. with: a) 0 g/l of Cl⁻ and b) 70 g/l of Cl⁻
Figure 16:
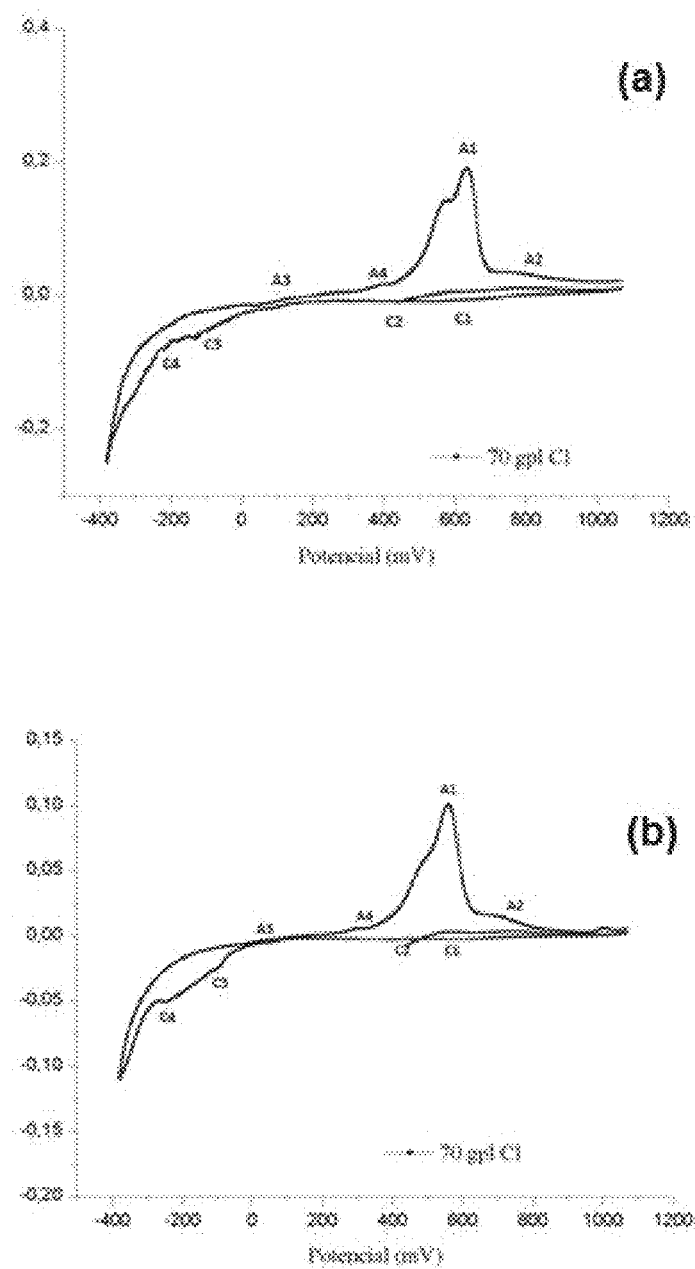
FIG. 16. Chart reflecting the cyclic CEP-CPY voltammetry with pre-treatment in a solution a solution of $H_2SO_4$ 0.1 M and Cl⁻ at 70° C. with different rest times: a) 15 days, b) 30 days.
Figure 17:
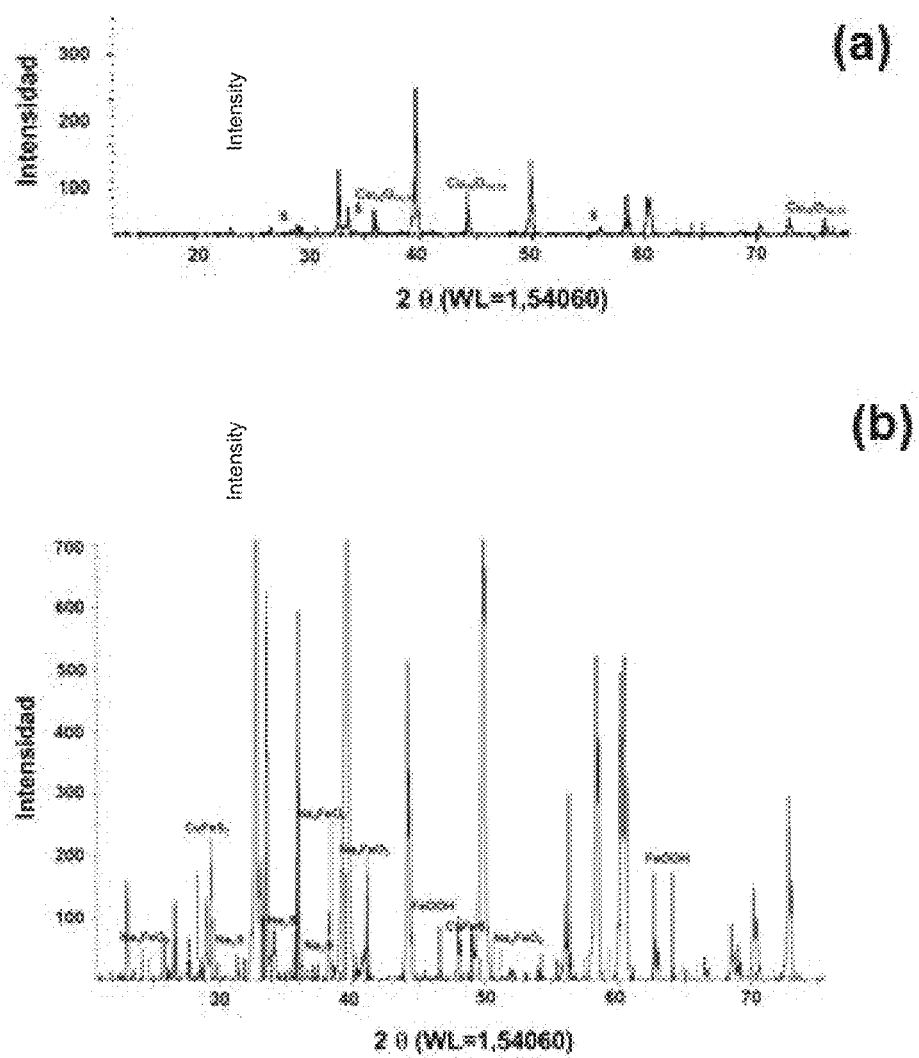
FIG. 17. Chart presenting the DRX analysis of the concentrate: a) without pre-treatment; b) with pre-treatment.
Figure 18:
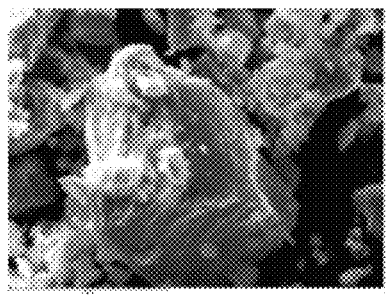
FIG. 18. Image and data of the SEM analysis of the chalcopyrite concentrate without pre-treatment.
Figure 19:
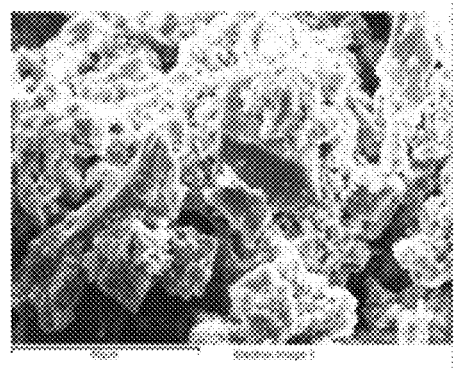
FIG. 19. Image and data of the SEM analysis of the chalcopyrite concentrate with pre-treatment and 15-days rest.
Figure 20:
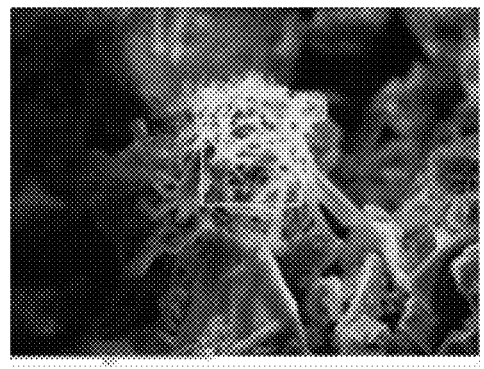
FIG. 20. Image and data of the SEM analysis of the chalcopyrite concentrate with pre-treatment and 30-days rest.
Figure 21:
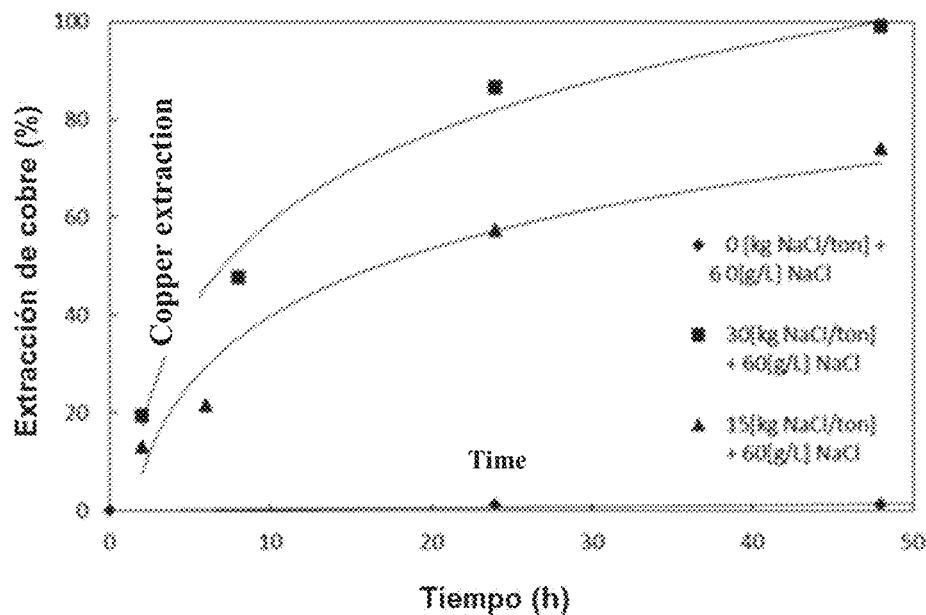
FIG. 21. Chart representing the kinetics of the extraction of copper from chalcopyrite concentrate, pre-treated at different doses of solid NaCl with 30-days rest; leached at pH=2 and 60 g/l of Cl—.

FIG. 12 shows a cross-section of the agglomeration drum with the internal components and their location inside the agglomeration drum being identified. In particular, FIG. 12 shows the main components of the agglomeration drum, which described upstream to downstream and according to the circulation of the material to be agglomerated comprise as follows: feeding chute 100, from which the material to be agglomerated enters; the main cylinder 200; the gasification chamber 210, located inside the main cylinder 200, in particular to the upstream end of said cylinder, receiving the material to be agglomerated for its mixing with gases; impeller 300, which separates the gasification chamber 210 from the agglomeration chamber 220, allowing the material to pass from said gasification chamber to said agglomeration chamber; the agglomeration chamber where the material is subject to mixing with the liquids entering through the pipes 230, 231, generating the reactions that will allow increasing the effectiveness of the agglomeration process; discharge chamber 400 that receives the agglomerated material going out from the agglomeration chamber; discharge chute 410, from which aggregates are extracted. Additionally, in FIG. 12 the supporting structure 600 can be noted, which provides support to the agglomeration drum and its components, providing a lower bean 630 which inclinations changes thanks to an inclination system 700 and the air recirculation system 500, which together with the exhaust hood 420 and the inlet of the agglomeration drum allow the recirculation of the gases generated inside the drum during the agglomeration process. In addition, FIG. 12 also shows the pipes 230, 231, through which fluids enter inside the agglomeration chamber. Finally, FIG. 12 shows the rack 201 as the element to transmit the rotation movement from a driver to the main cylinder, allowing that the whole drum rotates to generate the circulation and mix the material inside.

Figure 23:
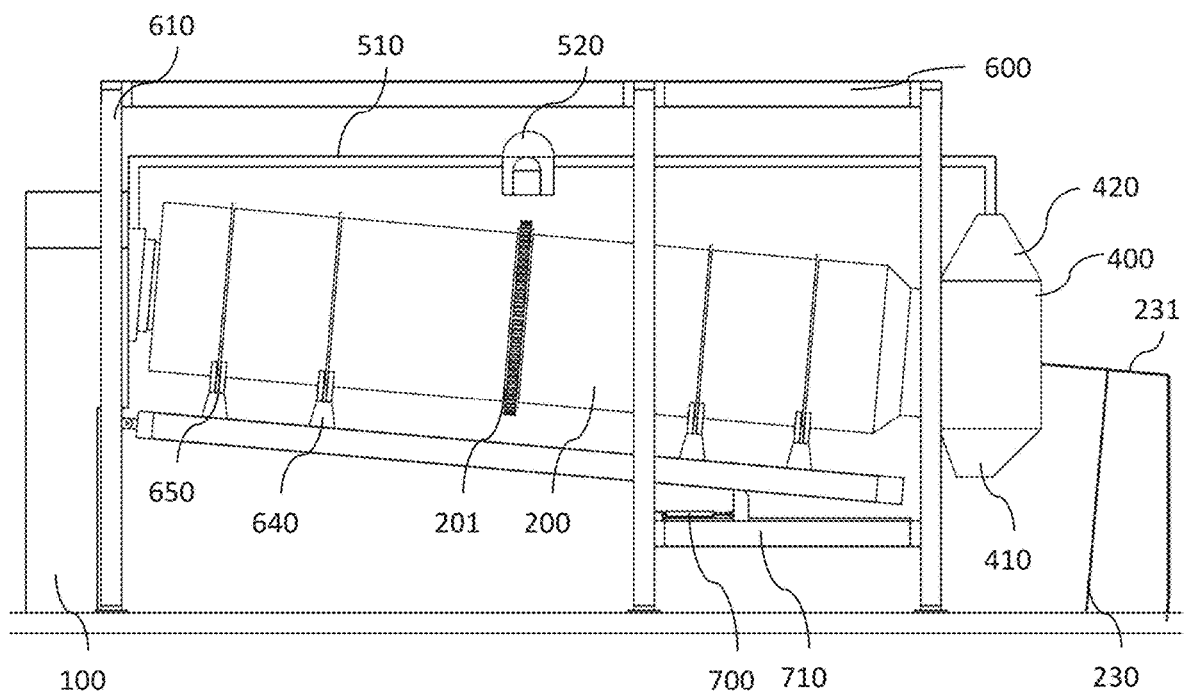
FIG. 23. It shows a scheme representing an embodiment of the agglomeration drum of the invention from the side including the system of injection.

Additionally, FIG. 23, like FIG. 1, shows a scheme of the agglomeration drum from its side face, this time showing the injection system through the pipes 230, 231 that go out from the discharge chamber 400 to the outside of the agglomeration drum.

Figure 24:
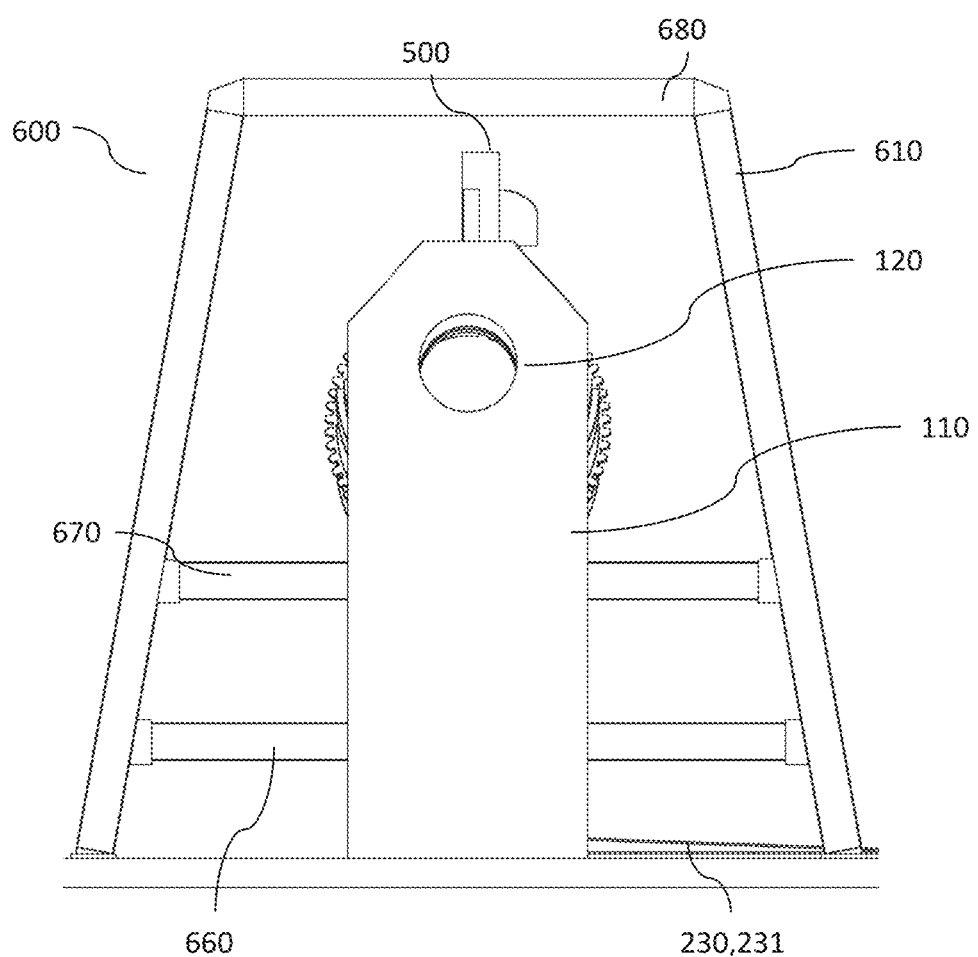
FIG. 24. It shows a scheme representing an embodiment of the agglomeration drum of the invention from the front face.

FIG. 24 shows a front view of the agglomeration drum showing the arrangement of the supporting structure 600 that comprise the feet 610, an upper beam 620, shown in FIG. 23 that joins the feet 610 through the at least one transversal beam 680. Additionally, FIG. 24 shows an embodiment with inlet transversal beams 670 and outlet transversal beams 660, where the outlet transversal beams 660 are at a lower height than the inlet transversal beams 670, since on the latter the at least one lower beam 630 supporting the main cylinder 200, pivots, see FIG. 23, where the outlet transversal beam 660 rests on the inclination system 700 that allows the lower beam 630 to pivot.

Figure 25:
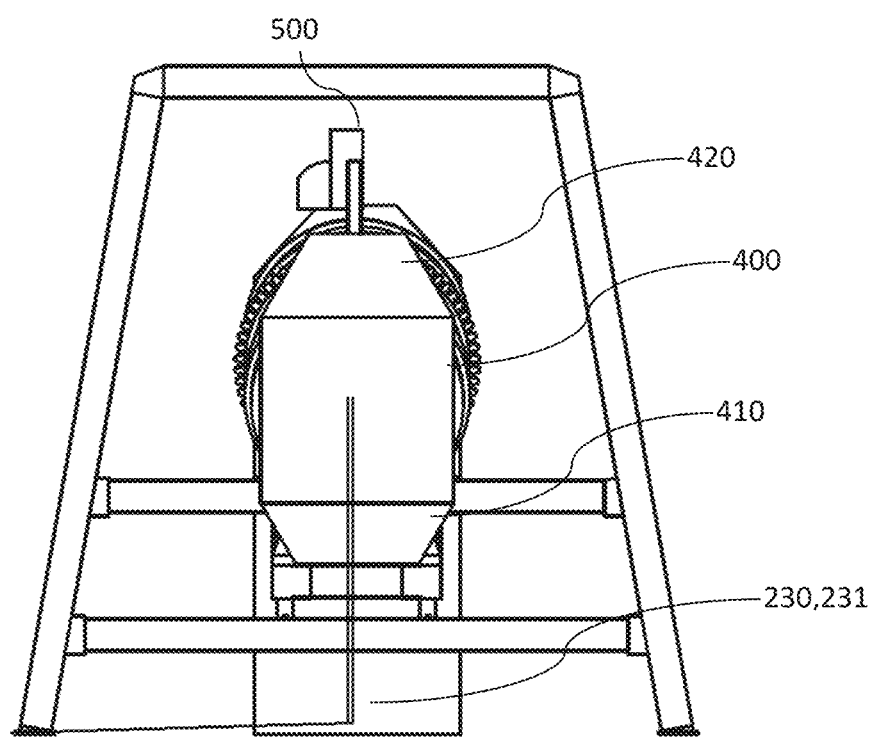
FIG. 25. It shows a scheme representing an embodiment of the agglomeration drum of the invention from the rear face.

FIG. 25 shows a rear view of the agglomeration drum showing the outlet of pipes 230, 231 belonging to the injection system from the discharge chamber 400.

Figure 26:
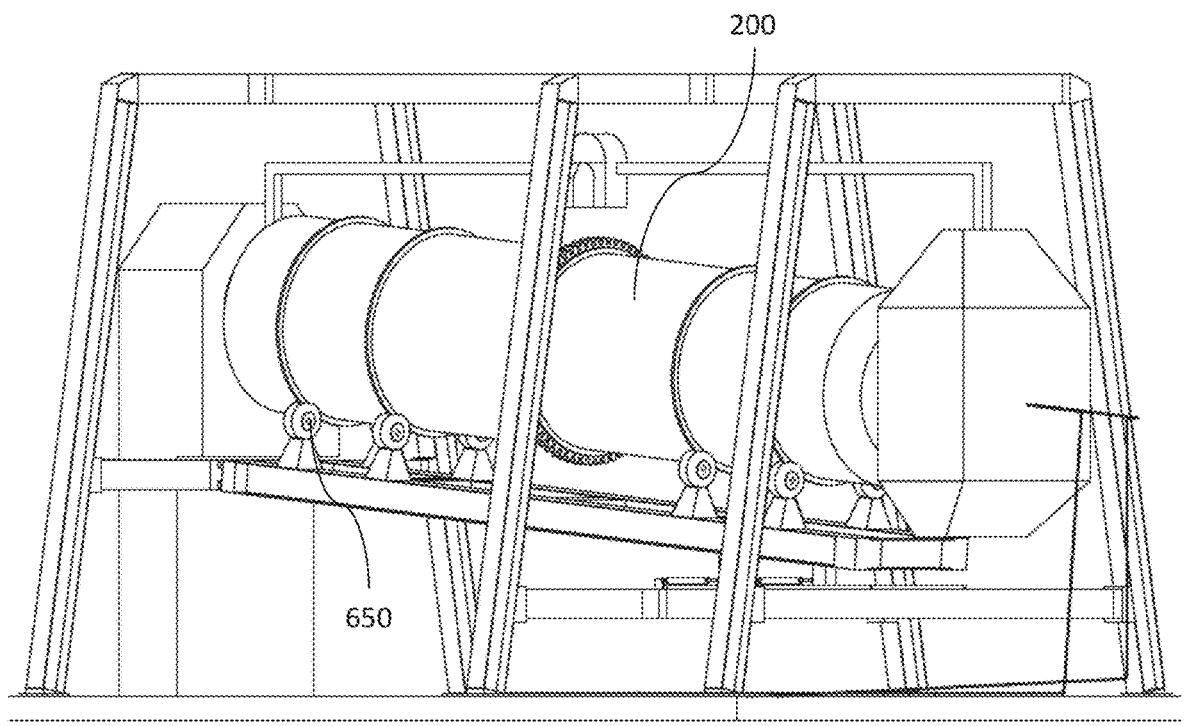
FIG. 26. It shows a scheme representing an embodiment of the agglomeration drum of the invention in perspective.

Finally, FIG. 26 allows to seeing a general scheme of the agglomeration drum of the invention through a perspective view. Both its mains component, as the main cylinder 200, and its secondary components, as the wheel 650, can be seen, both of them from the outside of the drum Once all components of the agglomeration drum of the invention have been described in detail, the operation thereof is then described for the conversion of metallic sulfides in metal sulfate and water soluble polysulfides, obtaining a highly porous rock matrix as a result that favors the later leaching process.

In the first stage, the mineral is added along with the solid NaCl inside the agglomeration drum through the inlet opening 120 of the feeding chute 100. Thus, the material enters the gasification chamber 210, where as a result of the drum rotation and helped by the loader lifters 213, the mineral is mixed with the solid NaCl and with gaseous HO that enters the gasification chamber 210 under pressure by the chamber openings 211 and through the nozzle openings 130. Thus, a fraction of the HCl is fixed to the mineral due to its humidity (preferably 3 to 5%), with the chemical attack being produced.

Due to the inclination of the main cylinder 200 regulated by the inclination systems 700, the material moving inside the gasification chamber 210 along with the not reacted gas goes towards the impeller 300 where it is lifted by the buckets of the blades 301 and transferred by gravity to the agglomeration chamber 220. In this chamber, the mineral plus the remnant HCl is intensively irrigated with water or refining agent spread inside the chamber through the pipe 230 and then irrigated with concentrated sulfuric acid (preferably at 95% purity) through pipe 231. In this context, the pipe 230 has openings distributed upstream the agglomeration chamber 220, while the pipe 231 has openings distributed downstream the agglomeration chamber, allowing the water or refining agent to spread to the material circulating through the agglomeration chamber before the sulfuric acid gets in contact with the material.

Due to exothermal reactions between the water and the concentrated sulfuric acid, as well as due to the transformation reaction experienced by the sulfur compounds present in the mineral treated by the presence of sodium chloride, temperatures between 50 and 80° C. generate in the agglomeration chamber. In this chamber, the material agglomerate is produced and the formation of gaseous HCl starts, which excess is collected in the exhaust hood 420 of the discharge chamber 400 and driven through the fan 520 and through the duct for gases 510 towards the gasification chamber 210, so that to combine it with the mineral and the solid NaCl entering a closes recirculation loop.

In addition, the solid agglomerate material moves on to the discharge chamber 400 and goes down the discharge chute 410 to leave the equipment.

Example of the Agglomeration Drum

According to an example of the present invention, an agglomeration drum was built as that shown in FIG. 1 with a total length of 19826 mm horizontally measured from the end of the feeding chute to the end of the discharge chamber, a total width of 16061 mm horizontally measured from the farthest ends of the feet and a total height of 10396 mm vertically measured from the feet base to the upper beam.

The main cylinder was built of a steel plate of 400 mm thick using thicknesses and materials that allow withstanding the work load inside the cylinder, where the working length of the main cylinder is 14200 mm and its external diameter 3500 mm, with inlet and outlet opening being described of internal diameters of 1500 and 2300 mm, respectively, and which lengths are 300 mm and 1485 mm respectively. In addition, the gasification chamber was built from titanium with a thickness and material allowing to withstanding the working load inside the chamber with a total length of 5050 mm and external diameter of 2700 mm. This chamber included fixed load lifters spaced by a distance of 396 mm, of 50 mm thick and 50 mm height. The chamber openings were performed in a 100 mm diameter for the passing of the recirculated gas injected through the injection nozzle. The intermediate space between the gasification chamber and the main cylinder is 400 mm for the circulation of the gas injected from the injection nozzle to the chamber openings. In addition, the injection nozzle, which has a diameter above 2200 mm and a connection to the feeding chute of 1800 mm diameter, has openings of 200 mm diameter radially arranged at a distance of 1437 mm from the nozzle center, comprising a connection to the gas recirculation system described as a 200 mm edge square opening present in the upper part of the nozzle.

Additionally, the agglomeration chamber keeps a total length of 9200 mm and an external diameter of 2900 mm, which was coated with an elastomer material cured to the inside wall of the main cylinder.

The impeller was built of titanium with an external diameter of 3100 mm and width of 205 mm with a front cover of 1000 mm radius and 8 blades spaced at 45° and joint through a central axis of 500 mm radius, with each of them comprising a concave bucket to take the material inside and lift it along with the rotation of the blades. The openings between the front cover and the impeller periphery are 350 mm height, being described between one impeller and the other for the lifting of the material and its later settlement of the central axis. Said impeller acts as a mixing element and for transferring material from the gasification chamber to the agglomeration chamber.

In order to drive the main cylinder, a motor device of 220 Hp was used, mainly considering for its design the speed required to achieve an efficient quality of agglomerate. In this respect, historical data were used corresponding to the critical and optimal rotation speed, which values depend on the diameter. Also, determining the drum's inertia moment was required, considering that said moment is the one to be overcome to start the drum rotation. Then, obtaining the torque required to start the movement of the drum the work power can be calculated and, along with this, to estimate the power required by the driving device.

Additionally, the fan used in the gas recirculation system corresponds to a fan of 0.09 to 1.1 kW power, mainly considering as a design parameter that the fan should extract all or most of the gas mass flow generated inside the agglomeration drum. For these purposes it was considered that the chemical reaction occurring inside the drum has an efficiency of about 98%, i.e. 2% of reagents do not react and the rest turns into hydrochloric acid with a concentration of about 38%. Then, calculating the mass flows of material it is estimated that the amount of acid generated is of 60000 kg/h. In this respect and through the density of the hydrochloric acid to the concentration indicated it is obtained that the flow of gas if about 50 cubic meters per hour. With this information, it is possible to estimate the dynamic and static pressure to be lifted by the fan or driver of gases in order to extract the total mass flow of gases generated inside the agglomeration drum, with this pressure being of about 78 kPa for this example.

Regarding the injection of fluids through the pipes entering the agglomeration chamber, water and HCl are injected independently, i.e. through a first pipe water is injected and through a second pipe acid is injected. In this respect, the injection of water is performed through the openings in the water pipe located upstream the agglomeration chamber, while the injection of acid is performed through the openings in the pipe of acid located downstream the agglomeration chamber. This means that first the material is moistened and after a given time of residence and displacement in the agglomeration chamber, the acid is injected for reaction.

Through the design of the equipment described, the optimal work conditions were achieved for the agglomeration drum as indicated in the table below:

TABLE 1

Optimal operating conditions of the mixer reactor

| Process variable | Unit | Range of variables Lower limit | Range of variables Upper limit |
| --- | --- | --- | --- |
| Treatment capacity mineral/concentrate | t/h | 800 | 2000 |
| Solid NaCl | kg/t | 5 | 50 |
| Water (fresh or seawater) or refining agent with respect to the impregnation humidity of the solid material | % | 20 | 50 |
| Natural humidity of the mineral/concentrate | % | 3 | 5 |
| Concentrated H2SO4 (regarding the standard consumption of the mineral or concentrate) | % | 30 | 100 |
| Mineral grain size distribution | centimeters | 1.90 | 2.54 |
| Grain size distribution of concentrate | □m | 160 | 250 |
| Temperature of first chamber | ° C. | 10 | 25 |
| Temperature of second chamber | ° C. | 50 | 80 |
| Redox potential | mV/ENH | 300 | 550 |

Process Application Example

In a particular embodiment the treatment of different samples was made in a scale prototype of the reactor of the invention, using low grade copper mineral called M1, M2 and M3, where sample M1 in particular is mineralogically dominated by chalcopyrite (CuFeS2) and chalcocite (Cu2S). Sample M2 is abundant in chalcocite (Cu2S) and covellite (CuS). M3 is mainly chalcopyrite (CuFeS2).

Figure 22:
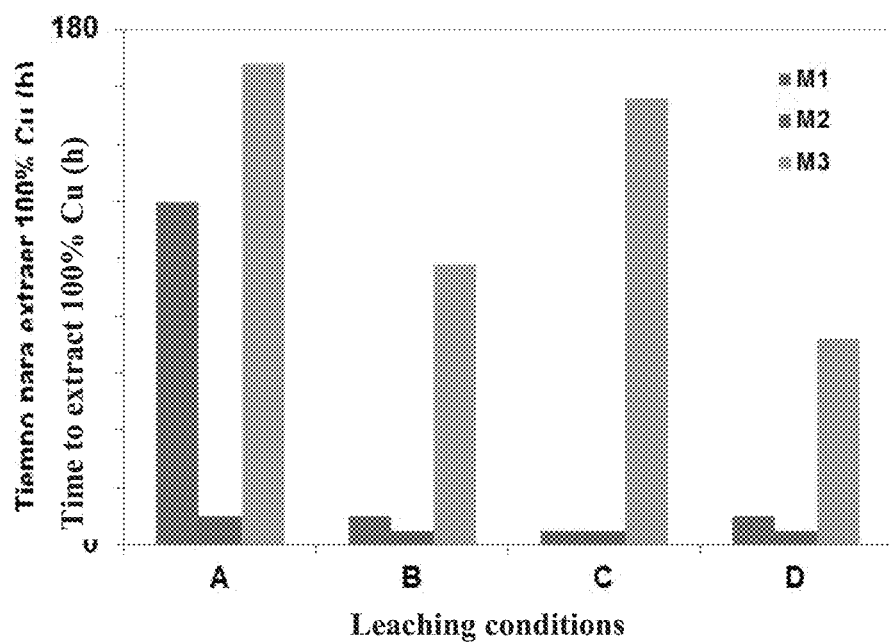
FIG. 22. Chart presenting the results of leaching of low grade chalcopyrite minerals in reactors stirred at 25° C.

Using the scale experimental model of the reactor of the invention, 100 g were charged of different minerals (M1, M2, M3), of low grade copper and with a grain size distribution of 100%—70 mesh ASTM along with NaCl 15 g/kg of mineral in a reactor, adding water to produce 20% of total humidity along with the addition of concentrate sulfuric acid considering 100% of the standard consumption of acid determined for each sample. The prototype agglomerator used in this experiment contained a gas recirculation system generated in the central chamber of agglomeration of said prototype, where the mixture is kept under constant stirring. The components were mixed for 5 minutes allowing rest for a variable time (0, 15 and 30 days). Then, the samples subject to different treatments were leached and the time required to extract 100% of copper contained in each sample was recorded with and without pretreatment as indicated in Table 1. The results of leaching of samples M1, M2 and M3 subject to the different treatments are shown in FIG. 22.

The leaching of the low grade chalcopyrite minerals (M1, M2 and M3) with a grain size distribution of 100%—70 mesh AST was conducted under stirring at 800 rpm under different conditions as indicated in Table 1. In FIG. 22 the importance of pretreatment in sulfur minerals is observed and in particular in those more refractory to leaching. In general, kinetics is improved by properly combining the pretreatment with chloride-containing solutions.

TABLE 2

Leaching conditions

| Experiment | Conditions |
| --- | --- |
| A | Without pretreatment and without chloride in the leaching solution |
| B | With pretreatment (15-days rest) and without chloride in the leaching solution |

TABLE 2-continued

Leaching conditions

| Experiment | Conditions |
|---|---|
| C | With pretreatment (30-days rest) and 70 g/L Cl in the leaching solution |
| D | With pretreatment (15-days rest) and 70 g/L Cl in the leaching solution |

The invention claimed is:

1. An agglomeration drum comprising:
a main hollow cylinder, inside of which the agglomeration process is performed;
a feeding chute provided in the end upstream the main cylinder for the entering of material to the inside of said cylinder through an opening of the feeding chute;
a discharge chamber provided in the end downstream the main cylinder opposing to a discharge chute for the discharge of the agglomerate material from the inside of said cylinder;
at least one driving device to drive a rotation movement in the main cylinder using the motor means provided in said cylinder and which transmit the movement thereto from the driving device;
at least one supporting structure over which the main cylinder rests allowing the same to rotate;
a gas recirculation system that extract the gases present inside the agglomeration drum downstream the main cylinder and inject said gases upstream said cylinder, wherein said gas recirculation system is connected to the agglomeration drum between one injection point an one extraction point;
an injection nozzle for the injection of recirculated gases in the injection point, wherein said injection nozzle is connected to the gas recirculation system for the gases to reenter inside the main cylinder;
a gasification chamber provided inside the main cylinder and in communication with the inlet opening of the feeding chute, wherein said gasification chamber has an inlet connected to the injection of gases nozzle for the gases to enter inside the gasification chamber; and
an agglomeration chamber provided next to the gasification chamber, wherein the agglomeration chamber comprises a fluid injection system inside.

2. The agglomeration drum according to claim 1, wherein the gas recirculation system comprises a duct for the conveyance of gases from the extraction point to the injection point and a gas-driving device to suck in the gases from the extraction point and drive them to the injection point, thus forming a closed loop of gases.

3. The agglomeration drum according to claim 1, wherein the gas recirculation system connects to an exhaust hood provided in the discharge chamber of the agglomeration drum, from which the gases present inside the discharge chamber are sucked.

4. The agglomeration drum according to claim 1, wherein the injection nozzle comprises nozzle openings for the injection of recirculated gases inside the gasification chamber from the gas recirculation system.

5. The agglomeration drum according to claim 1, wherein the injection nozzle is fixed to the opening of the feeding chute, wherein over said injection nozzle, both the main cylinder and the gasification chamber rotate.

6. The agglomeration drum according to claim 1, wherein the gasification chamber is configured as a concentric cylinder to the main cylinder, but with smaller diameter, forming an intermediate space between the external surface of the gasification chamber and the internal surface of the main cylinder, wherein the injection nozzle injects the recirculated gases through the intermediate space towards the gasification chamber.

7. The agglomeration drum according to claim 1, wherein the gasification chamber comprises an inlet face and an outlet face, comprising chamber openings provided in the inlet face for the gases to enter inside said chamber.

8. The agglomeration drum according to claim 1, wherein the gasification chamber comprises chamber openings provided in a mantle of said chamber.

9. The agglomeration drum according to claim 6, wherein the intermediate space comprises internal brackets and/or connections joining the main cylinder to the gasification chamber, rotating together.

10. The agglomeration drum according to claim 1, wherein the agglomeration chamber is made up from the inner space of the main cylinder, with the inner surface of said cylinder comprising a coating, wherein the coating comprises an elastomer material cured to the inner surface of the main cylinder.

11. The agglomeration drum according to claim 1, wherein the fluid injection system comprises at least one pipe along the main cylinder inside the agglomeration chamber, wherein said at least one pipe enters the agglomeration chamber through the downstream end of the main cylinder.

12. The agglomeration drum according to claim 1, wherein it also comprises an impeller provided between the gasification chamber and the agglomeration chamber, transferring the material from the inside of the gasification chamber to the inside of the agglomeration drum through the upstream face of the impeller and a downstream face of the impeller, wherein the impeller is provided coupled to the main cylinder, rotating together with said cylinder, wherein the upstream face of the impeller comprises the outlet face of the gasification chamber and the downstream face of the impeller comprises the inlet face of the agglomeration chamber, wherein the impeller comprises multiple blades to receive the material as it goes down the gasification chamber.

13. The agglomeration drum according to claim 12, wherein the impeller comprises a front cover provided in the upstream face of the impeller, wherein said cover has a smaller diameter than the impeller, leaving openings between one blade and the other and between the impeller perimeter and the perimeter of the front cover, wherein the front cover acts as restrictor of the flow of material, allowing it to be taken by the blades only near the ends of the impeller through the openings.

14. The agglomeration drum according to claim 13, wherein the downstream face of the impeller of the blades extends converging in a central axis of the impeller, wherein said central axis has a smaller diameter than the front cover, wherein the central axis of the impeller connects to the injection system through a stationary bracket mounted on a bearing at the central axis of the impeller.

15. The agglomeration drum according to claim 14, wherein the central axis of the impeller comprises a protection element made up in the form of cylindrical mantle covering the fluid injection system near the impeller.

16. The agglomeration drum according to claim 1, wherein the main cylinder is inclined over the supporting structure with its downstream end being located at a lower height than its upstream end, wherein the inclination of the main cylinder is manually or automatically adjustable using an inclination system provided in the supporting structure.

17. The agglomeration drum according to claim 16, wherein the inclination system comprises at least a hydraulic cylinder and at least one wedge, over which at least one lower beam of the supporting structure rests, wherein said at least one lower beam supports the main cylinder of the agglomeration drum and wherein said at least one lower beam connects to the supporting structure pivotally in one of its ends, so that its free end rests over the at least one wedge, wherein the displacement of the at least one wedge due to the action of the at least one hydraulic cylinder rises the free end of the at least one lower beam, thus varying the inclination of the main cylinder.

18. The agglomeration drum according to claim 17, wherein the at least one lower beam comprises supporting structures of the agglomeration drum, which have a system of wheels over which the main cylinder rests and rotates, wherein said wheels are assembled to the drum guides existing in the outer surface of the main cylinder.

19. The agglomeration drum according to claim 1, wherein the driving device comprises means to engage with the motor means of the main cylinder, transmitting the rotation of the driving device to said motor means and allowing the main cylinder to rotate in a controlled manner.

20. The agglomeration drum according to claim 1, wherein the rotation speed of the main cylinder is adjustable.

21. The agglomeration drum according to claim 1, wherein the driving device provides a rotational force that overcomes the inertia of the main cylinder loaded with material inside, starting the rotational movement to the main cylinder.

22. The agglomeration drum according to claim 1, wherein the motor means of the main cylinder correspond to a transmission system comprising a rack built in the cylinder, connected to if fixedly or forming part of its same structure, thus transmitting the rotational movement from the driving device to the main cylinder on a continuous base.

23. The agglomeration drum according to claim 1, wherein the motor means of the main cylinder corresponds to a transmission system rotational movement.

24. The agglomeration drum according to any claim 2, wherein the gas-driving device separates the recirculation system in a first part of extraction and a second part of injection, wherein the first part of extraction is provided with at least one particle filter.

25. The agglomeration drum according to claim 1, wherein the gasification chamber and/or the agglomeration chamber comprise at least one retainer transversally arranged in the inner surface of said chambers, wherein the retainer is independent to the structure of the main cylinder and is replaceable.

26. The agglomeration drum according to claim 1, wherein the gasification chamber and/or the agglomeration chamber comprise load lifters longitudinally arranged in the inner surface of said chambers, wherein the lifters are independent to the structure of the main cylinder and are replaceable.

27. The agglomeration drum according to claim 11, wherein the at least one pipe comprises openings arranged for the injection of the at least one fluid inside the agglomeration chamber.

28. The agglomeration drum according to claim 1, wherein the fluid injection system comprises at least two pipes for the injection of different fluids, wherein each pipe comprises openings provided for the injection of different fluids in different areas inside the agglomeration chamber.

29. The agglomeration drum according to claim 1, wherein the discharge chamber comprises a discharge chute provided at the bottom of said chamber, wherein the discharge chute may comprise at least on retainer.

30. A procedure for the agglomeration of mineral that is performed in an agglomeration drum, the procedure comprising:
    adding the mineral along with a solid reagent inside the agglomeration drum through an inlet opening of a feeding chute that feeds the agglomeration drum;
    entering the mineral and the solid reagent to a gasification chamber of the agglomeration drum, where the mineral starts to mix with the reagent and with the gas entering the gasification chamber as a result of drum rotation, wherein the gas enters into the gasification chamber through an injection nozzle connected to a gas recirculation system of the agglomeration drum;
    moving and mixing the mineral with the reagent and the gas, displacing the mixture to the inside of the gasification chamber along with the not reacted gas;
    transferring the mixture from the gasification chamber to an agglomeration chamber of the agglomeration drum;
    irrigating the mixture plus the remaining gas with at least one liquid spread inside the agglomeration chamber through a fluid injection system of the agglomeration drum, producing the agglomerate of the material and starting the formation of gas as a result of the reaction between the mineral and the reagents;
    moving and mixing the mixture of mineral, reagent and gas with the liquid reagents, displacing the mixture to the inside of the agglomeration chamber along with the not reacted gas;
    collecting the excess gas resulting from the reaction along with the not reacted gas through the recirculation system of the agglomeration drum, injecting the recirculated gas through the gas recirculation system towards the gasification chamber, through the injection nozzle, so that to combine it with the mineral and the reagent entering a recirculation loop; and
    extracting the solid agglomerate material that moves to a discharge chamber of the agglomeration drum to leave the agglomeration drum.

31. The agglomeration procedure according to claim 30, wherein the stages of moving and mixing comprise lifting the mixture through load lifters longitudinally arranged in the inner wall of the gasification chamber and/or agglomeration chamber, as applicable.

32. The agglomeration procedure according to claim 30, wherein the stage of transferring the mixture comprises lifting the mixture in an impeller provided between the gasification chamber and the agglomeration chamber, transferring the material from the inside of the gasification chamber to the inside of the agglomeration chamber through an upstream face of the impeller and a downstream face of the impeller.

33. The agglomeration procedure according to claim 30, wherein the stage of irrigating the mixture comprises irrigating with water or refining agent through the pipe of the fluid injection system first, and then with concentrated sulfuric acid through another pipe of the injection of fluid injection system, wherein the irrigation with water and acid inside the agglomeration chamber can be simultaneous or one before the other, according to the position of the openings along the pipes injecting the fluids inside the agglomeration chamber.

34. The agglomeration procedure according to claim 33, wherein the injection of water is performed upstream the agglomeration chamber, while the injection of acid is performed downstream the agglomeration chamber, allowing the water or refining agent to spread to the material circulating through the agglomeration chamber before the sulfuric acid gets in touch with the material.

35. The agglomeration procedure according to claim 33, wherein from the exothermal reactions between the water and the concentrated sulfuric acid, as well as a result of the transformation reactions experienced by sulfur compounds present in the mineral treated in presence of sodium chloride, temperatures between 50° C. and 80° C. generate in the agglomeration chamber.

36. The agglomeration procedure according to claim 30, wherein the gas is hydrochloric acid and the solid reagent is sodium chloride.

37. The agglomeration procedure according to claim 30, wherein the mixing movement inside the agglomeration drum is assisted by the inclinations of the agglomeration drum, with the residence time of the mineral inside the drum increasing or decreasing according to its inclination.

38. The agglomeration procedure according to claim 30, wherein the gas recirculation system used in the stage of collecting the excess gas sucks in the gas from the agglomeration drum's discharge chamber, through an exhaust hood arranged in said discharge chamber and by means of a fan, which in turn injects the gases sucked in to the inside of the gasification chamber through the injection nozzle.

39. A procedure to agglomerate low grade Copper mineral or Copper mineral concentrate, which is performed in an agglomeration drum, which comprises:
   adding the low grade Copper mineral along with NaCl and refining agent as reagent, in an amount between 5-50 kg/ton of mineral, inside the agglomeration drum through an inlet opening of a feeding chute that feeds said agglomeration drum;
   entering said mineral and NaCl to a gasification chamber of the agglomeration drum, where due to the rotation of the drum, the mixing of both components starts, which are exposed to the gas generated and recirculated to the gasification chamber, wherein the gas enters into the gasification chamber through an injection nozzle connected to a gas recirculation system of the agglomeration drum;
   moving and mixing the mineral with the reagent and the gas, displacing the mixture to the inside of the gasification chamber along with the gas generated or recirculated not reacted;
   transferring the mixture from the gasification chamber to an agglomeration chamber of the agglomeration drum;
   irrigating the mixture plus the remaining gas generated or recirculated with $H_2O$, thus spreading to the inside of the agglomeration chamber through a fluid injection system of the agglomeration drum, and with $H_2SO_4$, producing the agglomerate of material and starting the formation of hydrochloric acid gas as a result of the reaction between the mineral and other reagents;
   moving and mixing the irrigated mixture of mineral, reagent and gas displacing the mixture within the agglomeration chamber along with the gas generated and not reacted;
   collecting the excess gas resulting from the reaction along with the not reacted gas, through the recirculation system of the agglomeration drum, injecting the gas to recirculate it through the recirculation system to the gasification chamber, through the injection nozzle, so that to combine it with the mineral and the entering reagent in a recirculating circuit; and
   extracting the solid agglomerate material that moves on to a discharge chamber of the agglomeration drum in order to leave the agglomeration drum.

40. The procedure to agglomerate the low grade Copper mineral according to claim 39, where the grain size distribution of the mineral is between 1.90 and 2.54 cm.

41. The procedure to agglomerate the low grade Copper mineral according to claim 39, where the grain size distribution of the mineral concentrate is between 160 and 250 µm.

42. The procedure to agglomerate the low grade Copper mineral according to claim 39, where the mixing of mineral with NaCl is irrigated by adding between 20 wt % and 50 wt % of $H_2O$ with respect to the impregnation humidity of solid material, inside the agglomeration chamber through the fluid injection system.

43. The procedure to agglomerate the low grade Copper mineral according to claim 39, where the mixing of mineral with NaCl is also irrigated by adding between 30 wt % and 100 wt % of $H_2SO_4$ with respect to the standard acid consumption of the mineral or concentrate, inside the agglomeration chamber through the of fluid injection system.

44. The procedure to agglomerate the low grade Copper mineral according to claim 39, where during the procedure the temperature in the gasification chamber varies between 10° and 25° C.

45. The procedure to agglomerate the low grade Copper mineral according to claim 39, where during the procedure the temperature in the agglomeration chamber varies between 50° and 80° C.

* * * * *